United States Patent
Jones et al.

(10) Patent No.: US 8,979,976 B2
(45) Date of Patent: Mar. 17, 2015

(54) SOLVENT EXTRACTION PROCESS FOR SEPARATING COBALT FROM NICKEL IN AQUEOUS SOLUTION

(75) Inventors: David Llewellyn Jones, Delta (CA); Tannice Marie McCoy, Delta (CA); Keith Edward Mayhew, Delta (CA); Chu Yong Cheng, Beeliar (AU); Keith Raymond Barnard, Como (AU); Wensheng Zhang, Willetton (AU)

(73) Assignees: CESL Limited, Vancouver, BC (CA); Commonwealth Scientific and Industrial Research Organisation, Campbell, Australian Capital Territory (AU)

( * ) Notice: Subject to any disclaimer, the term of this patent is extended or adjusted under 35 U.S.C. 154(b) by 264 days.

(21) Appl. No.: 12/784,037

(22) Filed: May 20, 2010

(65) Prior Publication Data
US 2011/0283838 A1 Nov. 24, 2011

(51) Int. Cl.
C22B 23/00 (2006.01)
C22B 3/42 (2006.01)
C22B 3/00 (2006.01)

(52) U.S. Cl.
CPC .............. C22B 3/42 (2013.01); C22B 23/0476 (2013.01); C22B 23/0484 (2013.01)
USPC ............................................ 75/374; 75/425

(58) Field of Classification Search
CPC .... C22B 23/0476; C22B 3/42; C23B 23/0484
USPC .................................................. 75/374, 425
See application file for complete search history.

(56) References Cited

U.S. PATENT DOCUMENTS 4,120,817 A * 10/1978 Hummelstedt et al. ....... 252/364
4,166,837 A    9/1979 Gallacher et al.
(Continued)

FOREIGN PATENT DOCUMENTS

WO    02/22896 A1    3/2002
WO    02/22897 A1    3/2002
(Continued)

OTHER PUBLICATIONS

"The Winning of Nickel", by Joseph P. Boldt Jr., and Paul Queneau Sr., published by Methuen and Co. 1967.
(Continued)

*Primary Examiner* — Jie Yang
(74) *Attorney, Agent, or Firm* — Schwabe, Williamson & Wyatt

(57) ABSTRACT

A process for separating Co from Ni in an aqueous solution comprises subjecting the solution to extraction and using kinetic differences between Ni and Co in the extraction for achieving at least a partial separation of Co from Ni. This is effected by controlling the duration of the extraction so that a major portion of Co and a minor portion of Ni is extracted from the solution to produce a loaded extractant, enriched in Co and depleted in Ni compared to the feed solution, and a Co-depleted raffinate containing Ni. In a further embodiment, the invention utilizes kinetic differences between Ni and Co during striping for effecting separation of Ni and Co. The loaded extractant can be subjected to a bulk stripping or a selective stripping operation to obtain Co and Ni solutions from which Ni and Co can be recovered. The process may be incorporated in a hydrometallurgical process for the extraction of Ni and/or Co from an ore or concentrate containing Ni and Co.

74 Claims, 11 Drawing Sheets

(56) References Cited

U.S. PATENT DOCUMENTS

| | | | |
|---|---|---|---|
| 4,528,167 | A | 7/1985 | Preston |
| 5,447,552 | A * | 9/1995 | Mihaylov et al. ............... 75/722 |
| 5,925,784 | A * | 7/1999 | Sugiya et al. .................... 562/8 |
| 6,171,564 | B1 | 1/2001 | Jones |
| 6,231,823 | B1 | 5/2001 | Genik-Sas-Berezowsky et al. |
| 6,409,979 | B1 | 6/2002 | White |
| 7,387,767 | B2 | 6/2008 | Campbell et al. |
| 2006/0124893 | A1* | 6/2006 | Schaekers et al. ......... 252/182.1 |
| 2007/0248514 | A1* | 10/2007 | Cheng et al. ................... 423/139 |
| 2008/0038168 | A1* | 2/2008 | Cheng et al. ................... 423/24 |

FOREIGN PATENT DOCUMENTS

| | | |
|---|---|---|
| WO | 2005/073415 A1 | 8/2005 |
| WO | 2005/073416 A1 | 8/2005 |
| WO | 2006/032097 A1 | 3/2006 |

OTHER PUBLICATIONS

"The Past and Future of Nickel Laterites," by Ashok Dalvi, Gordon Bacon, and Robert Osborne in: PDAC 2004 International Convention, Trade Show and Investors' Exchange, (Mar. 7-10, 2004).

"Cobalt—Nickel Separation in Hydrometallurgy: a Review," by Douglas S. Flett, in: Chemistry for Sustainable Development 12 (2004), pp. 81-91.

"Direct Solvent Extraction of Nickel at Bulong Operations," by S. Donegan, in: Minerals Engineering 19 (2006), pp. 1234-1245).

Reid, J G and Price, M J, 1993. Ammoniacal solvent extraction at Queensland Nickel: Process installation and operation, in Solvent Extraction in the Process Industries vol. 1 (Proceedings of International Solvent Extraction Conference 1993) (eds: D H Logsdail and M J Slater), pp. 225-231 (Elsevier Applied Science: London and New York.

"Solvent Extractions for Nickel and Cobalt: New Opportunities in Aqueous Processing" by Indje Mihaylov, in: Journal of Metals (Jul. 2003), pp. 38-42.

"Direct Solvent Extraction of Cobalt and Nickel from Laterite Leach Liquors" by K. Soldenhoff et al, in: EPD Congress (1998), ed. P. Mlshra. pp. 153-165.

"Solvent Extractions Design Considerations for Tati Activox plant" by E. Robles et al in: Journal of the South African Institute of Mining and Metallurgy (Jun. 2009), pp. 383-391.

"Solvent Extraction testwork to evaluate a Versatic 10/NicksynTM Synergistic system for Nickel-Calcium Separation" by Rene du Preez et al in: the Fourth Southern African Conference on Base Metals, published by South African Institute of Mining and Metallurgy, pp. 193-210.

Kokusen H. et al., Kinetic Separation of Nickel(II) and Cobalt (II) with 5-Octyloxymethyl-i-Quinolinol by Differential Extraction, Anal. Sci., 4/5, Dec. 1988, pp. 617-622.

Kim, H.S., Tondre C., On a possible role of microemulsions for achieving the seprate of Ni2+, and Co2+ from their mixtures on a kinetic basis, Separation Science and Technology, 24/7-8, Jun. 1989, pp. 485-493.

Ismael, M., Tondre, C., Kinetically controlled separate of nickel (II) and cobalt (II) using micelle-solubilized extraction in membrane processes. Langmuir, 8/4, 1992, pp. 1039-1041.

* cited by examiner

SOLVENT EXTRACTION PROCESS FOR SEPARATING COBALT FROM NICKEL IN AQUEOUS SOLUTION

FIELD OF THE INVENTION

The present invention relates to a process for separating cobalt from nickel in an aqueous solution.

BACKGROUND OF THE INVENTION

Properties of Cobalt and Nickel in Aqueous Solution

Cobalt and nickel have very similar chemical properties. In aqueous solution both elements are normally found as divalent cations (e.g. $Co^{++}$ or $Ni^{++}$) in acid solution, with similar solubilities.

Both are soluble as the respective sulphates, chlorides, or nitrates in acid solution, but are largely insoluble in alkaline conditions unless chelating agents are present. (Both cations are chelated strongly by ammonia, for example). Their sulphide compounds have similar properties, (the $K_{SP}$ values are similar leading to a similar pH of formation with $S^{2-}$ ions), as do their respective carbonates.

This phenomenon presents an ongoing problem for the extractive metallurgist, as Co and Ni are invariably found together in naturally occurring ores, but must ultimately be separated to make maximum use of each metal. Fortunately however, there are exceptions to this pattern of similar behavior, which can be exploited, and will be discussed below.

Ratio of Cobalt to Nickel Occurring Naturally in Nickel Ores

Ni and Co commonly occur together in nature as sulphide ore deposits, and the ratio of Co:Ni in Ni ores is surprisingly constant in the range of about 1:15 up to 1:30. This is true at least in unaltered sulphide ores; although this ratio can be quite different if weathering of the ores has occurred, (over many millennia), A general review of nickel metallurgy is to be found in the excellent book "*The Winning of Nickel*", by Joseph P. Boldt Jr., and Paul Queneau Sr., published by Methuen and Co. 1967. A more recent review of laterites in particular is found in "*The Past and Future of Nickel Laterites*," by Ashok Dalvi, Gordon Bacon, and Robert Osborne in: PDAC 2004 International Convention, Trade Show and Investors' Exchange, (Mar. 7-10, 2004).

Weathering of surface Ni deposits is common especially in tropical countries, and such deposits are usually referred to as Ni laterites; due to slight differences in chemistry, this weathering frequently results in a partial separation of Ni and Co over a vertical horizon, compared to the original sulphide ore. Some concentration of Co into the so-called limonite layer often is the result, so Co:Ni ratios in laterites considered for hydrometallurgical processing vary substantially from the usual ratio in sulphides, e.g. a ratio of 1:10 or even lower may be found in limonite.

Co Separation from Nickel in a Leach Solution .... Overview

The distribution of Co and Ni in most leaching processes is very similar. Thus leaching of Ni—Co ores or concentrates usually results in a mixed solution of Co and Ni, as well as other materials.

However, Ni and Co have to be separated eventually to obtain maximum use and payment for each element, as their end-use is significantly different, e.g. different metal alloys. With only a few notable exceptions, Ni is much more abundant in ores or concentrates than Co. Thus in a mixed Ni—Co solution, the problem of separation can be more accurately stated as separating Co (as an impurity, albeit of value) from a Ni solution. It also happens that Co has a few specific chemical properties that allow for its selective extraction from a mixture of elements in solution, whereas Ni in general does not have such properties.

A variety of processes have been (and some still are) used commercially to achieve this objective, but all of them have significant costs, and it is the objective of the present invention to provide a more efficient and more cost-effective method.

Also, because of the greater value of Co, this need to purify the Ni solution of Co should not obscure the secondary need to also recover Co itself in an economic manner, which is part of the present invention.

A number of processes have been used commercially for Co separation from Ni, for example:

Precipitation of Co from Ni—Co Solution as $Co(OH)_3$

This is an old process, (see the above-referenced book by Boldt and Queneau), one of the first known methods, and still used commercially. With strong oxidants, a $Co^{++}$ solution can readily be oxidized to $Co^{+++}$, which is essentially insoluble in dilute acid solution (say pH 2-6). Co is thus precipitated as $Co(OH)_3$ whilst the Ni stays largely in solution. Oxidants used for this purpose include $Cl_2$ and ozone. Electro-oxidation can also be used. However, the process is costly and inefficient, due to significant co-oxidation of $Ni^{++}$ to a similar product, and has generally fallen out of favour.

Selective Solvent Extraction (SX) of Co from Ni—Co Solution

This approach has been the subject of many investigations, some of which have been commercialized, and some of these are listed in the referenced article, "*Cobalt-Nickel Separation in Hydrometallurgy: a Review*," by Douglas S. Flett, in: Chemistry for Sustainable Development 12 (2004), pages 81-91. There are some organic extractants which will selectively extract Co with respect to Ni. Primarily these are one of two types:

i) Ternary and quaternary amines (Alamine™ 336 for example), which can extract some metal chloride complexes (e.g. $CoCl_4^{2-}$) from a strong chloride aqueous environment. Unusually, Ni doesn't form such chloride complexes, so a good separation of Ni from other elements can sometimes be achieved. However, the requirement of the strong chloride concentration (several molar) severely limits the applicability of the process, and in reality omits it from serious consideration for a typical leach liquor.

ii) Phosphinic acids (e.g. bis 2,4,4-trimethylpentyl phosphinic acid, sold commercially as Cyanex™ 272), which will extract Co selectively over Ni, without the need for a chelating agent as in the amines. Although this extractant works well in pure solutions, unfortunately it also extracts many other metals commonly found in leach solutions, such as Mg and Mn, which limits its usefulness. This limitation is illustrated in the first two Examples described below. Although Mg can be scrubbed off the loaded organic stream by Ni/Co (with difficulty), by using a large number of mixer/settlers in counter-current mode, as was done at the Bulong plant (described by Donegan ("*Direct Solvent Extraction of Nickel at Bulong Operations*," by S. Donegan, in: Minerals Engineering 19 (2006), pages 1234-1245), Mn cannot be scrubbed off. The only remedy is to co-extract all the Mn along with the Co, and pay for the cost of the Mn extraction/stripping, particularly the cost of the ammonia used for neutralization of the organic extractant. As a result of this limitation, Cyanex 272 is best applied after some prior purification, which itself is both costly and inefficient.

Selective SX of Ni from Ni—Co Solution

This approach was invented and commercialized at the Queensland Nickel (QNI) plant in Yabulu, Queensland, Australia, very successfully in the 80's, and is well summarized by the above-referenced Flett review article, and also by Reid and Price.

(Reid, J G and Price, M J, 1993. Ammoniacal solvent extraction at Queensland Nickel: Process installation and operation, in *Solvent Extraction in the Process Industries Volume* 1 (*Proceedings of International Solvent Extraction Conference* 1993) (eds: D H Logsdail and M J Slater), pp 225-231 (Elsevier Applied Science: London and New York.

The process is effective but suffers from high cost, as the major component (Ni), is being extracted away from the 'impurity' (Co), generally a more expensive route than the opposite. The impurities are all left with the Co.

Also the extractant used (hydroxyoxime) is prone to rapid degradation by Co II oxidation, and hence must be re-oximated on a regular basis, at considerable cost. Pre-oxidation of Co II to Co III is necessary to minimize this problem, but is not 100% effective, leading to continuous re-oximation of the extractant, at high cost.

Stripping of the Ni from the loaded organic can be done with either strong ammonia solutions (250 g/l $NH_3$), or by acid, as was done at the Cawse mine in Western Australia for a while, as discussed by Flett (referenced above). The former fits in well with $NiCO_3$ production, (by steam stripping of $NH_3$), the latter with a Ni electrowinning flowsheet.

Although technically feasible, this approach is relatively expensive as noted, and does not produce a pure Co product, as the Ni left in the raffinate produces a Ni:Co ratio in this stream of at least 1:1. At Yabulu, a separate Co refinery had to be built eventually for re-processing of the Co-rich stream, and this refinery had its own technical and financial challenges.

Hydrogen Reduction of Ni from Ni—Co Solution

This approach was first commercialized in about 1950 at the Sherritt Gordon plant in Fort Saskatchewan, Alberta, as described by Boldt et al. The method has been considered the standard process for nickel recovery by some designers; it has been installed in several other nickel plants since, but suffers from significant drawbacks:

Batch mode operation. The process apparently can only be operated in this way, (instead of the usual continuous mode). This then requires multiple units (autoclaves), with low operating time (need to fill and discharge each batch autoclave frequently)

These features lead to high capital and operating costs

Heightened safety and occupational health requirements

Need for concentrated Ni solution (50-100 g/l [Ni]), and high solution feed temperatures, approx 200° C., again leading to high costs.

Need for careful control of pH, in pH 7.0 range, with high background levels of ammonium sulphate (200 g/l).

Large by-product production of ammonium sulphate crystals, at about 7× tonnage of Ni metal production, necessitating evaporative crystallizers, filters, dryers, bagging, storage facilities, etc. All leading to high costs.

Technically complex, thus requiring high level of technical skill, and expensive engineering input from a very limited number of qualified suppliers Further processing costs, downstream from the actual hydrogen reduction due to need for further purification to remove trace amounts of impurities such as S and O. High temperature oxidation and reduction furnaces are needed for this purification.

Relatively poor quality of Ni product, regarding Co content

Poor quality of Co product, as the raffinate contains a Ni:Co ratio of about 1:1, leading to need for another Co refining step, similar to the process described in previous section.

Difficulties with Separation of Cobalt from Nickel in the Presence of Impurities As described in the previous section, Co separation from Ni is difficult, and specific to each situation, e.g. solution chemistry and particularly the impurities in the Co—Ni solution. For solutions derived from leaching sulphide concentrates (as at Sherritt Gordon, for example), impurities are generally confined to other base metals such as Fe, Cu and Zn, which can be removed efficiently by known purification methods.

However, for acidic solutions derived from leaching of laterite ores, other impurities are found, particularly Mg and Mn, and often in much greater concentrations relative to the Ni and Co concentrations, e.g. as much as 10× greater. This situation makes it near difficult to use the preferred Cyanex 272 Co extraction method described above without some form of pre-treatment to separate Co and Ni from these impurities, or alternatively pay for the expense of co-extracting Mn.

Thus, unless Mn extraction is to be tolerated and paid for, treatment of laterite leach liquors is usually required to choose one of two routes:

Precipitation of Ni and Co in acid solution away from impurities as much as possible, followed by re-leaching to form a new solution with reduced impurity content. This approach for example was followed in the Murrin plant, which is described by Campbell et al in U.S. Pat. No. 7,387,767, and also in the Cawse plant, described by White in U.S. Pat. No. 6,409,979.

Leach in an ammoniacal alkaline environment, wherein most of damaging impurities are largely absent. This approach is adopted by the Caron process, for example (described in Boldt and Queneau), which was used at the QNI plant in Yabulu mentioned above, (now under different ownership and renamed).

The Caron process requires a pretreatment process of its own, a reductive roast at high temperature. This is a pyrometallurgical process, and requires high capital investment. It also has high energy requirements and thus has high operating costs. For these reasons, it is generally not considered today, although a few plants built years ago are still operating.

Practically then, one is confined to the precipitation and releach option as a pre-treatment prior to Co—Ni separation.

For laterite ores therefore, it is desirable, even necessary, that the Mn/Mg be separated out from Ni/Co by first precipitating the Ni/Co from solution, and then releaching. This is usually done by one of two methods:

1. $H_2S$ precipitation of mixed Ni/Co sulphides, (which selectively precipitates Ni/Co over Mn/Mg), followed by filtration and then pressure oxidation of mixed sulphides precipitate, with associated filtration steps, to produce a Ni/Co solution suitable for efficient Cyanex 272 extraction of Co, (as is now done at Murrin Murrin, op cit), or 2. Mixed hydroxide precipitation of Ni/Co with MgO (which can be done selectively over Mn and Mg, as practiced at Cawse plant for example, and patented by White, op cit), or with CaO, which is not so selective with respect to Mg/Mn. At Cawse, this was followed by re-leaching of mixed hydroxides with ammonium carbonate solution, filtering, then steam stripping the $NH_3$/$CO_2$ from the leach liquor to precipitate Mn/Mg, (and re-adsorbing the same $NH_3/CO_2$), and re-filtering.

Either of these processes for Mn/Mg rejection is expensive, especially in capital costs ($H_2S$ generating plant, or stripping and absorption plants for $NH_3/CO_2$). It is an objective of the present invention to be able to treat high Mn/Mg solutions containing both Ni and Co, and separate Co from this solution, without going through either of the existing Mn/Mg rejection alternatives sketched out above.

Unfortunately, a large amount of gypsum is formed along with the mixed Ni—Co hydroxide precipitate (MHP) when slaked lime is used as the precipitant for Ni and Co; consequently the MHP contains about 50 wt % gypsum, and only 50 wt % actual Ni and Co hydroxides, (and hence about 22% Ni).

Also both Mg and Mn are partly precipitated from solution (as hydroxides) at about the same pH as Ni and Co, thus further contaminating the product. This is a particular problem for laterites where these impurities are usually present in high concentration, e.g. in leach liquors derived from laterites by a High Pressure Acid Leach (HPAL) process.

Mn is of special interest as well because MHP is of course a mixture of Ni and Co compounds, which eventually have to be separated to make commercial Ni and Co products. The conventional technology for this separation is to use solvent extraction on a Ni/Co solution, in particular the extractant Cyanex 272. This Cyanex 272 separation is only feasible if Mn and Mg are very low in the feed solution, otherwise they interfere with the Co extraction. Generally this limits such refining to feed materials that are already low in Mn: Ni sulphide concentrates generally fall into this category, or are smelted to matte anyway, which is an effective Mn removal step, (into the slag). For feed materials that have not been smelted, e.g. laterite high pressure acid leach liquors, a significant Mn presence may be a serious impediment to further processing.

Commercial Value of Nickel Hydroxide Products

Mixed Ni—Co hydroxide (MHP) has been produced by at least one Ni mine in the recent past, and several announced projects have included this intermediate in the process flowsheet. However, this product has uncertain market value and a limited marketing history, due in part to its purity and grade. Since Ni and Co must be separated eventually, the presence of other impurities in the MHP can be a serious impediment to said separation, as described in the previous section.

If slaked lime, ($Ca(OH)_2$), is used as the reagent, it typically precipitates some Mg and Mn from solution along with Ni and Co; and if any traces of base metal impurities, (e.g. Cu, Fe, Zn and Cd), are left in solution from the prior purification, they are also precipitated into the MHP. In addition, gypsum is formed of course, thus degrading the Ni grade of product by about 50%. If MgO is used instead of slaked lime, better selectivity is found in respect to Mg, and of course no gypsum is formed, so the Ni grade is much better, but most of the same impurity issues remain.

All of the above can affect on the marketing of the MHP, and hence its commercial value. Nevertheless for projects with limited Ni/Co production it may be advantageous to be able to sell the MHP as an intermediate product, and thus avoid the extra cost of full refining to metal products on a small scale. It was of some importance therefore to improve the quality of MHP, by Co separation upstream.

Therefore if the Co is separated out before the precipitation process, the resultant Ni Hydroxide Product (NHP) may have enhanced value.

U.S. Pat. No. 6,171,564 relates to a process for treatment of nickel ores and concentrates to recover both Ni and Co as refined metals. It is a 'comprehensive' process in the sense that:

a) Both sulphides and oxides (laterites) are considered as suitable feeds, and
b) The process describes a complete flowsheet going all the way to metal product:
   Acid leaching of solid feed to produce an acidic leach solution, containing Ni, Co and numerous impurities
   purification of leach solution, in several steps, including solvent extraction
   precipitation of Ni and Co together as an impure mixed hydroxide by neutralizing acidic solution
   Releaching of mixed hydroxide in (recycled) ammoniacal solution to redissolve Ni and Co values
   Separation of Co from Ni in said solution by solvent extraction, followed by stripping and recovery of Co product
   Further purification of (ammoniacal) raffinate from Co solvent extraction by additional solvent extraction steps
   Extraction of Ni from purified ammoniacal solution, followed by acidic stripping of organic stream to form purified acidic Ni solution
   Ni recovery from purified solution by electrowinning, with recycling of spent acid to solvent extraction The Ni and Co content in the feed material are first leached by pressure oxidation (in the case of sulphides) or by acid pressure leaching (in the case of laterites); then the solution is purified to remove primarily Cu, Zn and Fe. From the purified solution, Ni and Co are precipitated together at about pH 7-8, using slaked lime, as a mixture of Ni and Co hydroxides, (MHP).

MHP is then re-leached in mild conditions, (ambient temperature, dilute solids, neutral pH) with a strong ammonium sulphate solution (200 g/l) at about pH 7.0, as in Reaction (1):

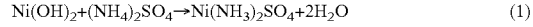
$$Ni(OH)_2 + (NH_4)_2SO_4 \rightarrow Ni(NH_3)_2SO_4 + 2H_2O \qquad (1)$$

Thus this leach produces a solution of Ni and Co diammine, ($Ni(NH_3)_2^{++}$ and $Co(NH_3)_2^{++}$ ions), which also contains some impurities, notably Mg and Ca.

The leaching of Ni and Co by this method is not very efficient, (about 90%), due to the mild conditions selected, i.e. the neutral pH and hence very low free ammonia content of the leach solution; almost none of the Ni species in solution is present as free ammonia, $NH_3$. As a consequence, significant Ni and Co are left behind in the residue, which therefore has to be releached to avoid unacceptable losses. However, the choice of the neutral pH is very important to enable the subsequent solvent extraction steps to proceed efficiently.

Co is then extracted selectively from this impure Ni/Co diammine solution using as extractant the Cyanex 272 reagent at about this same pH 7.0, leaving Ni in the raffinate.

Since the extraction is from a diammine, (i.e. $Co(NH_3)_2SO_4$), no neutralization is required to maintain a constant pH, as the ammine is simultaneously converted to ammonia ($NH_3$) during the extraction, which exactly balances the acid production (H+ ions) from the organic reagent, and thus produces ammonium sulphate in the overall extraction reaction (2):

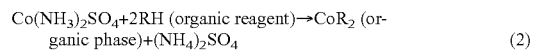
$$Co(NH_3)_2SO_4 + 2RH \text{ (organic reagent)} \rightarrow CoR_2 \text{ (organic phase)} + (NH_4)_2SO_4 \qquad (2)$$

Thus the pH stays almost constant throughout the Co extraction, negating the usual need for neutralizing agent. This is an unusual and most beneficial feature of this solvent extraction process, as most other Co and Ni solvent extraction processes need in situ neutralization with ammonia or caustic to counteract acid production, and thus maintain the solution pH within the required range during the reaction, (or else the extraction stops prematurely). The significance of the neutralization goes far beyond the simple avoidance of reagent consumption; the normal byproduct of such neutralization with ammonia or caustic is a salt such as ammonium sulphate or sodium sulphate, which rapidly accumulates in the raffinate stream, and must be disposed of in some fashion. This is a serious challenge, given the constraints of the system, such as metal contamination of said salt as a potential byproduct, and is sometimes fatal to a process design.

Co extraction at this point is only about 90% of the Co contained in the diammine solution, and co-extraction of Ni and Mg is negligible, thus providing a relatively pure Co stream (in the loaded organic), in the absence of Mn, Fe, Cu or Zn (all of which can co-extract with Co). Co extraction is kept deliberately less than 100%, to ensure that the loaded organic (loaded organic) is fully loaded with Co, thus minimizing co-extraction of Mg and Ni, (which are less strongly extracted than Co). Even then, some scrubbing of loaded organic is required to remove the small amounts of Mg and Ni that are extracted. Scrub feed is derived from a fraction of the (pure) cobalt strip liquor, which is in limited supply, since the Ni:Co ratio in the solution is typically >10:1; so minimizing of scrubbing requirements is essential.

Co is then stripped from the loaded organic in conventional fashion with dilute sulphuric acid solution to form a concentrated and pure Co solution, (low in Mg and Ni), and then recovered from this strip solution by conventional electrowinning (as pure metallic cathode), or by precipitation with some suitable reagent (e.g. sodium carbonate) as a pure Co salt, carbonate or hydroxide, etc.

Cyanex 272 is applied as an extractant again at pH 7.0-7.5 to the Co raffinate, to recover the residual Co, (about 10% of feed Co in ammonium sulphate solution), and also to remove any Mg and Ca from this solution prior to Ni recovery. This is called the magnesium extraction stage for sake of reference. About 10% of feed Ni is also extracted here into the loaded organic, leaving about 90% of feed Ni in raffinate from this operation. Stripping of the loaded organic stream with acid produces an acidic aqueous stream which is recycled to the leach circuit for recovery of Ni/Co values. Co in raffinate is very low, (~1 ppm [Co]), in order to produce high purity Ni in the next step.

Ni is extracted from Mg raffinate with LIX™ 84 extractant at about pH 7.0-7.5, as in Reaction (3);

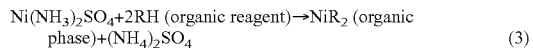

$$Ni(NH_3)_2SO_4 + 2RH \text{ (organic reagent)} \rightarrow NiR_2 \text{ (organic phase)} + (NH_4)_2SO_4 \quad (3)$$

The Ni extraction is followed by acidic stripping of the loaded organic, to produce a pure Ni electrolyte, (4), and recovery of Ni metal as cathodes by conventional electrowinning, reaction (5):

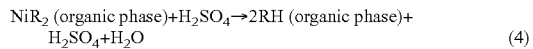

$$NiR_2 \text{ (organic phase)} + H_2SO_4 \rightarrow 2RH \text{ (organic phase)} + H_2SO_4 + H_2O \quad (4)$$

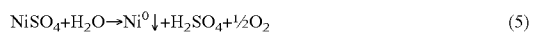

$$NiSO_4 + H_2O \rightarrow Ni^0\downarrow + H_2SO_4 + \tfrac{1}{2}O_2 \quad (5)$$

The final Ni raffinate is recycled to the original ammonium sulphate leach, completing the circuit.

It is to be noticed that the overall reaction, i.e. combining leaching of Ni hydroxide, solvent extraction, solvent stripping and electrowinning, reaction (6), has no reagent consumed and no byproducts, other than water and oxygen:

$$Ni(OH)_2 \rightarrow Ni^0\downarrow + H_2O + \tfrac{1}{2}O_2 \quad (6)$$

Numerous other steps, (e.g. washing, scrubbing and stripping), are combined with each of the three main extractions, i.e. Co, Mg and Ni. Altogether about 40 individual mixer-settlers are used, making for quite a complicated and expensive process for Co removal, hence the incentive to make it simpler.

Finally it is worth emphasizing that the Co extraction by solvent extraction in U.S. Pat. No. 6,171,564 is only performed after first precipitating a mixed hydroxide, and then re-leaching this solid.

In case it might be wondered why this sequence is required, it is our contention that Co extraction by solvent extraction is quite inefficient if such precipitation/re-leach is not carried out, due to the impurities present in the feed liquor to precipitation.

In other words the Co solvent extraction with Cyanex 272 when applied to the (acidic) feed liquor to this precipitation is inefficient as it contains too many interfering impurities, particularly Mg and Mn; both of these impurities compete with Co in the acidic solutions.

Effectively this means that the hydroxide precipitate has to stay as a mixed hydroxide, containing both Ni and Co, as well as Mg and Mn, which limits its marketability in practice. It is worth noting that most Ni refineries now use Cyanex 272 for separating Co from Ni, so feed materials to these refineries are usually restricted to low Mg and low Mn materials. In practice, this means feed materials to Ni refineries are currently either Ni mattes or mixed sulphides, not mixed hydroxides or concentrates; hence the marketability for mixed hydroxide has not been established so far, and represents a significant uncertainty for any mine project that depends on selling such a product at a good price.

Reference is also made to patent applications WO 02/22896 A1; WO 02/22897 A1; WO 2005/073415 A1; WO 2005/073416 A1 and WO 2006/032097 A1 of the Commonwealth Scientific and Industrial Research Organisation (CSIRO) which has been engaged for some years in researching the field known as Synergistic Solvent Extraction (SSX). This technique makes use of two or more extractants combined together to achieve beneficial effects superior to those of the individual extractants.

Co and/or Ni extraction from solution is the subject of a number of these patent applications, but generally they are extracted together from other impurities. The concept of trying to separate Ni from Co is evidently not contemplated in any of these patent applications.

Also, these patent applications do not contemplate trying to take advantage of kinetic differences between Ni and Co in extraction, which is an important and unusual feature of the present invention, i.e. unusual in solvent extraction.

Rather, extraction efficiencies in these prior applications by CSIRO are generally based on steady-state results, i.e. results which approach equilibrium, (the normal situation in solvent extraction).

Patent Application WO 2005/073415 discloses a process for selectively extracting Co and/or Mn from leach solutions containing Mg, Ca (and possibly Mn), using a combination of two organic extractants. This combination is made up of a carboxylic acid such as Versatic™ 10 (2-methyl, 2-ethyl heptanoic acid) and a hydroxyoxime such as LIX™ 63 (5,8-diethyl-7-hydroxy-6-dodecanone oxime).

The extraction process with this blend has superior selectivity possibilities for Co, Ni and Mn over the impurities mentioned, compared to extraction with Versatic 10 alone.

This improvement is expressed as a downward (synergistic) shift in the isotherm for Co, Ni and Mn (the $pH_{50}$ is reduced by 1-3 pH units). Cu and Zn behave similarly (synergistic shift), whereas Mg and Ca behaved in the opposite sense, i.e. antagonistic shifts to higher $pH_{50}$.

Taken together, this picture indicates improved separation possibilities for Co, Mn, Ni, Cu and Zn from Mg and Ca. However, it is noted that extraction of Ni with this organic combination is relatively slow compared to Co and Mn; Example 2 and FIG. 3 indicate that 10 minutes extraction is needed to get even 85% Ni extraction, (compared to <1 minute for Co and Zn), whereas the isotherm (where steady state conditions apply) indicates almost quantitative Ni extraction is possible at say pH 5. The implications are that the Ni extraction kinetics aren't fast enough to allow for a practical process for Ni extraction, and thus the focus is primarily on Co and/or Mn extraction.

Stripping of Mn and Co from the loaded organic (LO) is accomplished quickly with dilute acid, presumably at ambient temperatures (not specified though).

Considering the overall process, (extraction plus scrubbing and stripping), Co can be extracted together with Mn from a leach solution, and thus separated from Mg and Ca; alternatively Co can be extracted preferentially from Mn as well, presumably by operating at a lower pH. Small concentrations of Mn can also be scrubbed from the LO by Co if desired, (presumably this only works if Mn extraction is modest compared to Co loading).

As explained above, Ni extraction with this system is not attractive, as the Ni extraction kinetics are too slow to be useful, even though the Ni isotherm is similar to that of Co. Some Ni will extract inevitably though if present in the feed solution, and has to be stripped with Co or separated out subsequent to stripping. So Ni is more of a nuisance to a Co purification process, if anything. If present, Cu and Zn also extract in a similar fashion to Co, and must be separated out by selective stripping or in subsequent steps on the strip product stream.

Thus this process is particularly aimed at Co extraction away from common leach liquor impurities, particularly Mg and Ca, where the Co is the only metal of interest (i.e. Cu, Zn and Ni are missing or in minor concentrations), and is not particularly attractive for solutions that contain high Ni as well as Co.

Patent Application WO 2005/073416 is particularly aimed at Co and/or Ni extraction away from common leach liquor impurities, particularly Mn, Mg and Ca. It uses a similar organic mixture as WO 2005/073415, e.g. Versatic 10 and LIX 63, except that a $3^{rd}$ component is added, a so-called kinetic accelerator like TBP.

This $3^{rd}$ component literally accelerates the extraction of Ni, so that both Ni and Co are extracted together, and thus compensates for the perceived slow extraction kinetics of Ni. It also accelerates the stripping of Ni from the organic.

The benefits of the synergistic system together with the accelerator are described in Examples 1-8, and shown in FIGS. 4-9, 11 and 12.

The process has several embodiments, distinguished largely by the design of the stripping circuit, to separate Ni from Co, after the two metals have been co-extracted into the organic phase. Co strips more easily than Ni, so selective stripping is an option for separating the two metals, using mild conditions, e.g. with dilute acid or at higher pH.

Thus in Option 1 (page 13), Co is selectively stripped from the loaded organic, leaving the Ni behind for later stripping under more severe conditions. This option is shown as flowsheets in FIGS. 1-3, and described in Examples 9 and 10.

In Option 2 (page 16), Co and Ni are stripped together, and then the strip product liquor containing both metals (but notably free from Mg) is then subjected to a $2^{nd}$ extraction, typically using Cyanex 272, which is selective for Co over Ni, (as noted above) in the absence of Mg and other metals. This option is described in Example 11, and shown in FIG. 10.

Various complications in both options arise with other metals, e.g. Cu, Mn and Zn, which co-extract with Co and Ni, and have to be subsequently separated out during stripping, or by scrubbing, from Co and Ni.

In none of the examples shown, nor in the text or claims, is Co separated from the Ni in the solution by selective extraction, as in the present invention.

SUMMARY OF THE INVENTION

According to the invention, there is provided a process for separating Co from Ni in an aqueous feed solution, comprising subjecting the solution containing Ni and Co to extraction with an extractant and using kinetic differences between Ni and Co in the extraction by controlling duration of the extraction, whereby a major portion of Co and a minor portion of Ni is extracted from the solution to produce a loaded extractant enriched in Co and depleted in Ni compared to the feed solution and a Co-depleted raffinate containing Ni.

The duration of the extraction may be controlled by limiting the duration of the extraction to a period wherein a maximum ratio of Co:Ni has been extracted or it may be controlled by limiting the duration of the extraction to a period wherein a maximum ratio of Ni:Co remains unextracted or it may be controlled by limiting the duration of the extraction to a period wherein the ratio of Co:Ni that is extracted and the ratio of Ni:Co that remains unextracted are at optimum values.

The feed solution may be acidic.

The significance of conducting the separation in acid solution, is that the process can be applied to a typical leach liquor, (which is frequently an acid leach of some description). Thus there is no need for prior precipitation of Ni/Co, and subsequent leaching, which has been required until now for efficient Ni/Co separation, as described above.

This invention provides a new and more efficient method for Co separation, which can be used with fewer prior purification steps, in particular without the Ni/Co precipitation and releach.

Hence the new process is more rugged than the prior art processes in this field, i.e. it is able to withstand the presence of key impurities such as Ca, and thus offers a potentially more economical route to Co separation from Ni.

In addition to Ni, other metals that may be present in the feed solution are also rejected efficiently into the raffinate, notably Mg and Mn. Thus leach liquors bearing these impurities even in high concentration, can be treated for Co extraction.

The extraction may be carried out at a temperature of about 15° C. to 50° C., preferably 20° C. to 35° C. It has been found that a lower extraction temperature favours the Co:Ni extraction ratio. Even though the Co extraction is less at lower temperatures, the Ni extraction is reduced even further. The optimum temperature may be decided by a number of factors including ease of operation, number of stages, etc.

The extraction may be carried out at an organic to aqueous ratio of about 0.5:1 to 4:1, preferably 0.5:1 to 2:1.

The pH at which the extraction is effected may be controlled by adding an alkali, such as one or more of NaOH, $NH_3$ and KOH. For example, an alkali may be added to the extractant in an amount of about 0.01 to 0.3 grammole per liter, preferably 0.02 to 0.2 grammole per liter.

The extraction may be carried out at a pH of about 2.5 to 5.5, preferably about 3.8 to 4.7.

The extraction may be carried out in one or several stages, for example two successive stages. The duration of the extraction may be about 30 to 240 seconds per stage, preferably about 30 to 180 seconds per stage.

During a first stage of the extraction, alkali may be added to the extractant at about 0.01 to 0.15 grammole per liter of extractant, preferably about 0.02 to 0.08 grammole per liter of extractant. During a second stage an alkali may be added to the extractant at about 0.01 to 0.15 grammole per liter of extractant, preferably about 0.02 to 0.08 grammole per liter of extractant.

The extractant may comprise a mixture of at least two extractants, for example a carboxylic acid, such as Versatic™ 10 (2-methyl, 2-ethyl heptanoic acid), and a hydroxyoxime, such as LIX™ 63 (5,8-diethyl-7-hydroxy-6-dodecanone oxime).

The carboxylic acid extractant percentage may be about 2 to 20 v/v % with reference to total volume of the extractants and a diluent, preferably 2.5 to 5 v/v %. The hydroxyoxime extractant percentage may be about 4 to 40 v/v %, preferably 5 to 30 v/v %.

No kinetic accelerator is used, as in some of the prior art above, and in fact it is an aspect of the invention that the slow kinetics for one or both Ni extraction and Ni stripping are utilized to facilitate Co separation, rather than being considered as an impediment to the process.

The process may further comprise stripping Co and Ni from the loaded extractant with an acidic strip solution to produce an aqueous Co and Ni product solution and a stripped extractant which is recycled to the extraction process to complete the cycle. Sufficient acid is used in the acidic strip solution so that the product solution may have a pH of about 1.5 to 2.5, preferably 1.6 to 2. The stripping may be carried out at a temperature of about 30° C. to 60° C., preferably about 40° C. to 55° C. and may be carried out in one or more stages, for example 1 to 6, preferably 2 to 4, for a duration of about 3 to 15 minutes per stage, preferably 5 to 10 minutes per stage.

The aqueous product solution may be subjected to a further Co extraction stage to produce a Co-loaded extractant, which is subjected to further stripping to produce a Co product solution, and a second Ni raffinate which is combined with the Co-depleted raffinate from the Ni and Co extraction to produce a Ni product solution.

The further extraction may be carried out with a different extractant, such as Cyanex 272 (bis 2,4,4-trimethylpentyl phosphinic acid).

According to another embodiment, the process may further comprise selectively stripping Co from the loaded extractant from the Ni and Co extraction with a dilute acidic strip solution to produce a Co solution and a partially stripped extractant and then subjecting the Co solution to a second Co extraction to produce a Co-loaded extractant and a second Ni raffinate. The Co solution may have a pH of about 1 to 2.5, preferably about 1.7 to 2.2.

The selective stripping may be carried out in 1 or 2 stages for a duration of about 1 to 10 minutes, preferably 3 to 5 minutes, per stage and at a temperature of about 20° C. to 40° C., preferably about 25° C. to 35° C.

The process may further comprise stripping Ni from the partially stripped extractant with a stronger acidic strip solution to produce a Ni solution and a stripped extractant and recycling the stripped extractant to the extraction. The Ni solution may have a pH of about 1 to 2, preferably about 1.2 to 1.8.

The Ni-stripping may be carried out at about 30° C. to 60° C., preferably 40° C. to 55° C. and in one or more stages, for example 1 to 6, preferably 2 to 4, for a duration of about 3 to 15 minutes per stage, preferably 5 to 10 minutes per stage.

The process may further comprise scrubbing any Mn present from the loaded extractant, before any stripping, with a scrub aqueous solution comprising part of the solution enriched in Co or a part of the raffinate. The Co to Mn ratio in the scrub solution may be about 10:1 to 0.75:1, preferably 1.6:1 to 0.4:1. The scrubbing may be carried out at a temperature of about 20° C. to 40° C., preferably 25° C. to 35° C.

Also according to the invention there is provided a hydrometallurgical process for the recovery of Ni and/or Co from an ore or concentrate or other feed material containing Ni and Co, comprising subjecting the feed material to acid leaching to obtain a resultant acid leach solution and subjecting the leach solution containing Ni and Co to extraction with an extractant and using kinetic differences between Ni and Co in the extraction by controlling duration of the extraction, whereby a major portion of Co and a minor portion of Ni is extracted from the solution to produce a loaded extractant and a Co-depleted raffinate containing Ni.

Other aspects and features of the present invention will become apparent to those ordinarily skilled in the art upon review of the following description of specific embodiments of the invention in conjunction with the accompanying Figures and Examples.

BRIEF DESCRIPTION OF THE DRAWINGS

Embodiments of the present invention will now be described, by way of example only, with reference to the accompanying drawings, in which.

DETAILED DESCRIPTION OF SPECIFIC EMBODIMENTS

Figure 1:
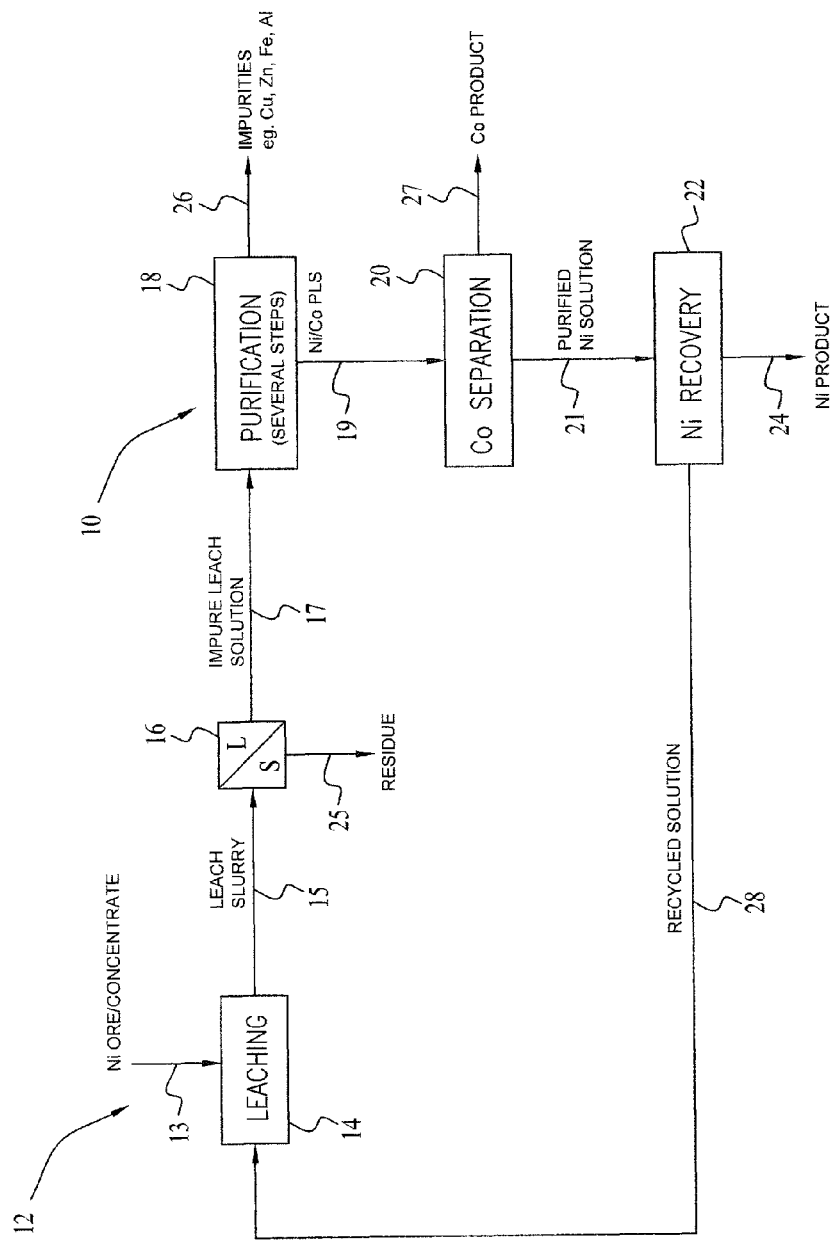
FIG. 1 is a simplified flowsheet of a process for separating Co from Ni in solution shown as being applied in an overall hydrometallurgical process for the treatment of ores or concentrates containing Ni and Co.

With reference to FIG. 1, a process 10 for separating Co from Ni in solution is shown as being incorporated in a hydrometallurgical process 12 for the recovery of Ni and Co from an ore or concentrate 13, or other feed material containing Ni and Co.

The ore or concentrate 13 containing both Ni and Co is first leached 14 to produce a leach slurry 15, from which the leach solution 17 is separated, as shown at 16, to leave behind a residue 25 by the standard methods of thickening and/or filtering. Such leach liquors inevitably contain numerous metals besides Ni and Co, notably Fe, Cu, Zn, Cd, Al, Mg, and Mn, to name a few.

Most of these cause difficulties with the eventual Ni—Co separation, (using known technology, as discussed above), so must be dealt with first. This is effected in a purification stage 18 where some of these impurities 26, such as Cu, Zn, Fe and Al, are separated from the Ni—Co solution 17 obtained from the leaching stage 14 to result in the aqueous feed solution 19. The purification stage 18 invariably consists of a number of steps, including solvent extraction, precipitation of impurities, etc. The details of the purification process 18 naturally depend on the impurities present and their relative concentrations.

Thus if Cu is present in economically significant concentrations, solvent extraction would be considered as this is an effective and selective process for Cu recovery. If only trace amounts of Cu are present, sulphide precipitation would likely be used, as this also removes Cd and Zn very effectively in a Ni/Co solution. Fe and Al removal generally is accomplished by neutralization with limestone or lime. Mg and Mn removal is more problematic as has been discussed previously. However, in the present process removal of Mg and Mn, along with Ca, is not required as these impurities are effectively controlled during the extraction.

The next step in the process is Co extraction 20, the duration of which is controlled so that the bulk of the Co in the solution 19 is extracted along with a minor portion of the Ni, as will be described in greater detail below, to obtain a Co—Ni solution 27 from which Co metal product can be recovered. The raffinate 21 from the solvent extraction 20 is a purified Ni solution.

The following step is Ni recovery 22 from the raffinate 21 to final product 24, e.g. by electrowinning. The raffinate 28 from the Ni recovery 22 is recycled to the leaching stage 14.

The invention has several embodiments, largely dependent on how stripping is effected after Co extraction 20. Essentially Co can be selectively stripped with respect to Ni, and then the Ni stripped subsequently, or Co and Ni can be stripped together in a bulk stripping operation.

In addition there are other embodiments of the invention suited for varying feed materials, such as solutions derived from leaching laterite ore, instead of sulphide concentrates. Such solutions may have different Ni:Co ratios and different levels of impurities (Mg and Mn for example), and thus require a modified flowsheet for optimum results.

In the process, there are two basic steps in the solvent extraction process: extraction and stripping. In addition, a third step, saponification, is sometimes needed as a separate step before extraction, or is sometimes combined with extraction.

The extraction process 20 typically uses a mixture of two or more extractants and critically the time of extraction is controlled so as to optimize Co extraction at the expense of Ni extraction.

Co extraction is typically quite fast compared to Ni extraction, with retention times measured in seconds rather than minutes. Ni extraction is never zero, but by careful control of retention times, as well as other factors, the Co extraction can reach almost quantitative levels, with less than 20% Ni extraction. This enables the process to effectively purify the Ni solution of its Co content, and reach a Ni:Co ratio of >667:1, sufficient to satisfy the Co specification for LME Grade Nickel. (Co specification is 0.015% maximum).

In the saponification step, the organic stream is contacted with an alkali such as caustic to pre-neutralize, or saponify, the organic extractant prior to contact with the aqueous stream. Alkali addition is required during or before extraction because the extraction process creates acid, and if not compensated, the acid will lower the pH of the feed solution. Co extraction is dependent on the pH, typically it should be maintained in the pH 2.5-pH 5 region (this will be discussed in more detail below), so to avoid acidification and a consequent drop in pH, alkali should be added, either before or during extraction or both.

In extraction, cobalt and some nickel are extracted from a low acid aqueous solution. The extracted cobalt and nickel are transferred (loaded) onto the organic stream with a reaction analogous to reaction (3) above. Reference to "organic stream" or "organic" implies the extractant with a diluent. Therefore, where more than one extractant is used, the term implies a mixture of the extractants and a diluent.

The extraction process 20 typically takes place in more than one stage, wherein the aqueous feed solution is contacted by organic streams more than once. There are several possible arrangements for such a multi-staged process and counter-arrangements are sometimes used, wherein the organic feed stream and the aqueous feed stream move in different directions.

Figure 2:
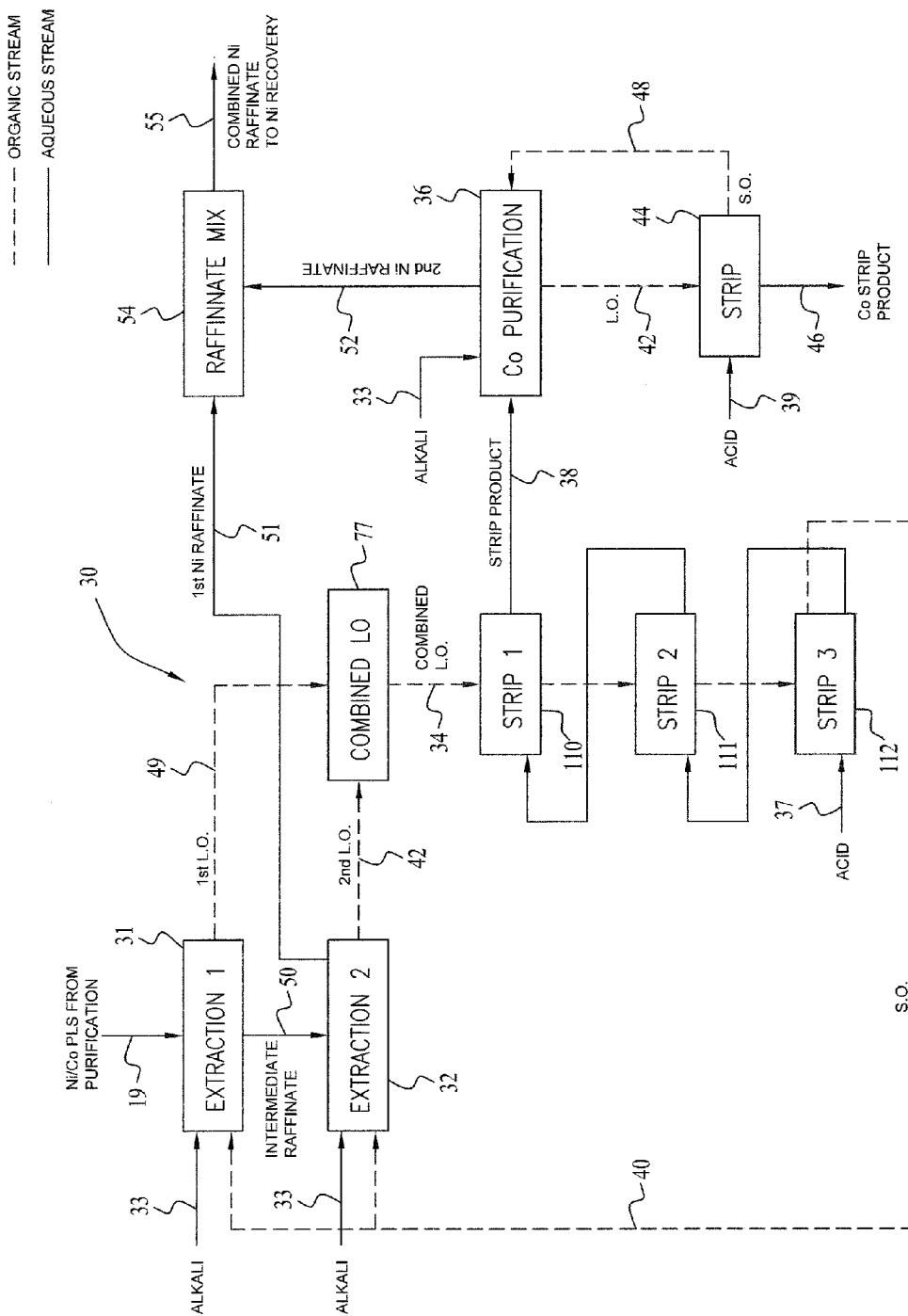
FIG. 2 is a flowsheet of one embodiment of the process with bulk stripping of Co and Ni taking place.

A preferred embodiment is a series parallel extraction circuit, wherein the aqueous feed solution is contacted by successive increments of organic stream, each one being a freshly stripped organic. A typical arrangement for the extraction is shown in FIG. 2, with a series parallel circuit. FIG. 2 will be described in more detail below. The feed material to the process shown in FIG. 2 is the aqueous feed solution 19, referred to in FIG. 1, containing Ni and Co, a solution that has already been treated to remove certain impurities, such as Cu, Zn, Cd, Fe, Al, for example, as described above.

Figure 14:
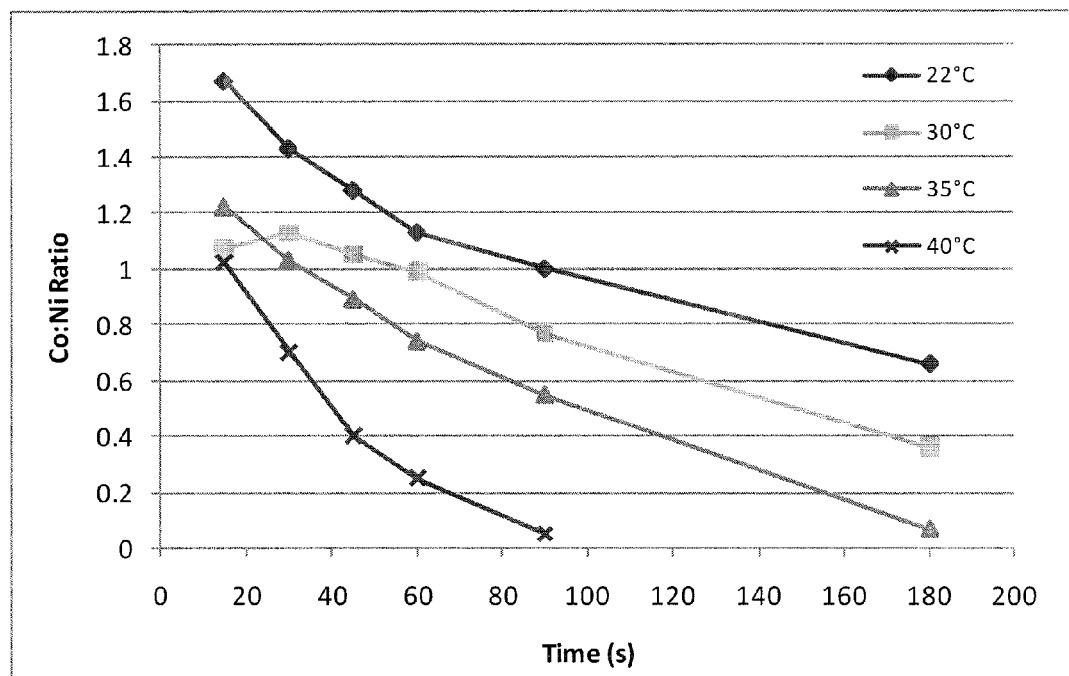
FIG. 14 is a graph showing Co:Ni ratio in a loaded extractant for solvent extractions at different temperatures.

Lower temperatures of extraction favour the Co:Ni extraction ratio, due to the more rapid decrease in Ni extraction at low temperature, as seen in Table 38 and FIG. 14. FIG. 14 shows the effect of temperature on the Co:Ni ratio obtained in extraction with the new invention; tests were run at pH 4.5, with an organic to aqueous ratio of 1:1, using 4.7 v/v % Versatic 10 and 14 v/v % LIX 63 in Shellsol D70 as the extractant. The extraction was from an aqueous feed solution with a Ni:Co ratio of approximately 20:1.

As can be seen from Table 38 at 22° C. the Co extraction is slightly lower than at higher temperatures, but the Ni extraction is much lower at 22° C. compared to say 40° C., leading to a greatly increased Co:Ni ratio in the loaded extractant.

Prior to the extraction, saponification is effected, wherein the stripped organic is neutralized with an alkali, as discussed above.

In another embodiment, the saponification takes place simultaneously with the extraction, at least in part, so some alkali is added to the organic before extraction, and some is added into the mixture of aqueous and organic during extraction, to maintain a target pH, as will be discussed in the Examples below.

The final step is stripping, where the cobalt and nickel are stripped off the organic stream with acid and released into an aqueous product solution. The bulk stripping option is shown in FIG. 2, and the stripped organic stream is then recycled back to saponification and/or extraction, to complete the loop.

In FIG. 2 with bulk stripping, the strip liquor typically will contain an approximate nickel to cobalt ratio of about 3:1, depending on the Ni:Co ratio in the feed solution 19.

A more detailed description of FIG. 2 will now be given showing a flowsheet of one embodiment 30 of the invention where bulk stripping of Co and Ni takes place.

In this embodiment, the extraction 20 takes place in two stages, namely a first extraction 31 and a second extraction 32. The organic stream is shown in broken lines and the aqueous stream is in solid lines.

The extractions 31 and 32 use a combination of two extractants to extract most of the Co in aqueous feed solution 19.

The extraction 31 produces an intermediate raffinate 50 which is subjected to the second extraction 32 which in turn produces a raffinate 51 containing the unextracted Ni and impurities such as Ca, Mg and or Mn.

The loaded organic (LO) 49 and 42 from the extractions 31 and 32, respectively, are combined as shown at 77 to produce a combined loaded organic 34.

For pH control, alkali 33 is added to extractions 31 and 32, either by being added to the organic prior to contact with the aqueous feed 19, 50 (saponification) or during the extractions 31 and 32, or both.

To summarize, the products of the extractions 31 and 32 are an aqueous stream (raffinate) 51 denuded of Co as much as possible and a loaded organic (LO) 34 containing the extracted Co values. As discussed above, this is achieved by careful control of the duration of the extractions 31 and 32.

Approximately 97% to 98% of the Co is extracted with a minimum of Ni co-extracted, typically 10 to 20%.

The loaded organic 34 is stripped of the Co and Ni by subjecting it to stripping which is carried out in three stages 110, 111 and 112, in counter-current mode.

This is effected by feeding an acidic stream 37 to the third stage 112 of the stripping operation and feeding the loaded organic 34 to the first stage strip 110. The organic 34 and the acidic stream 37 flow in opposite directions through the stripping stages 110, 111 and 112, wherein Co and Ni are stripped from the organic 34 during each of the three stripping stages 110, 111 and 112. This produces a stripped organic (SO) 40 which is recycled to the extractions 31 and 32 and a strip product 38 which contains virtually all of the Co values, together with some Ni.

The conditions of stripping in 110, 111 and 112 are controlled to maximize Co stripping but not the Ni stripping. For economic reasons it is useful to recover nearly all of the Co in the loaded extractant 34 by stripping. However, it is neither necessary nor advantageous to completely strip Ni.

Although, it is beneficial to strip most of the Ni from the loaded extractant 34 to allow the next cycle of extraction to proceed efficiently, a small amount of Ni left behind on the stripped extractant 40 allows the stripping to be carried out in slightly less severe conditions (less acid used for example), and this is still compatible with efficient stripping in the next extraction cycle. Starting with say 1 to 2 g/l Ni in loaded organic, it is found that about 200-250 mg/l [Ni] may be left on the stripped organic stream 40, and still achieve satisfactory extraction with the next cycle.

This allows the stripping to be carried out with the minimum of acid consumed, and also produces a strip product 38 with minimum acidity, which benefits future processing options.

Typically the Ni:Co ratio in the strip product 38 is about 3:1, due to the predominance of Ni in the original feed solution 19, but this varies of course according to the ratio in the feed solution 19.

The strip product 38 is now further refined by a further Co extraction 36, which completes the Co separation process, and returns the small amount of Ni back to the main Ni-bearing stream, for eventual Ni recovery. It is now possible to use known processes for the extraction 36, because the first extractions 31 and 32 have effectively eliminated most of the damaging impurities, such as Mn, Mg and Ca, which would otherwise make this uneconomic. This point is further illustrated in the Examples below. The extraction 36 with Cyanex 272 as extractant is now very selective for Co compared to Ni, and virtually no Ni is extracted, thus producing a very high Co:Ni ratio in the organic stream (LO) 42. In this case alkali 33 is also added for pH control.

Any traces of Cu or Zn in the original feed solution 19 will report to the strip product 38 and can now be separated from the Co in the Co extraction 36 as is commonly done in Co refineries.

The loaded organic 42 from the extraction 36 is subjected to stripping 44 with acid 39 to produce a strip product (Co solution) 46 and stripped organic 48 which is recycled to the extraction 36.

The strip product 46, which is essentially a pure Co stream, free of Ni and other impurities, can be easily processed to a marketable Co product, such as solid $CoCO_3$, by precipitation with $NaCO_3$, a method well known in the industry.

The raffinate 51 from the second extraction 32, which has a very high Ni:Co ratio, is combined with the raffinate 52 from the extraction 36, as shown at 54, to produce a combined raffinate 55. The raffinate 55 is treated for Ni-recovery by various methods well known in the industry.

The Ni raffinate 55 produced is suitable for a number of subsequent steps; for example Ni may be precipitated by MgO as a hydroxide with a nickel to cobalt ratio of at least 667:1.

Figure 3:
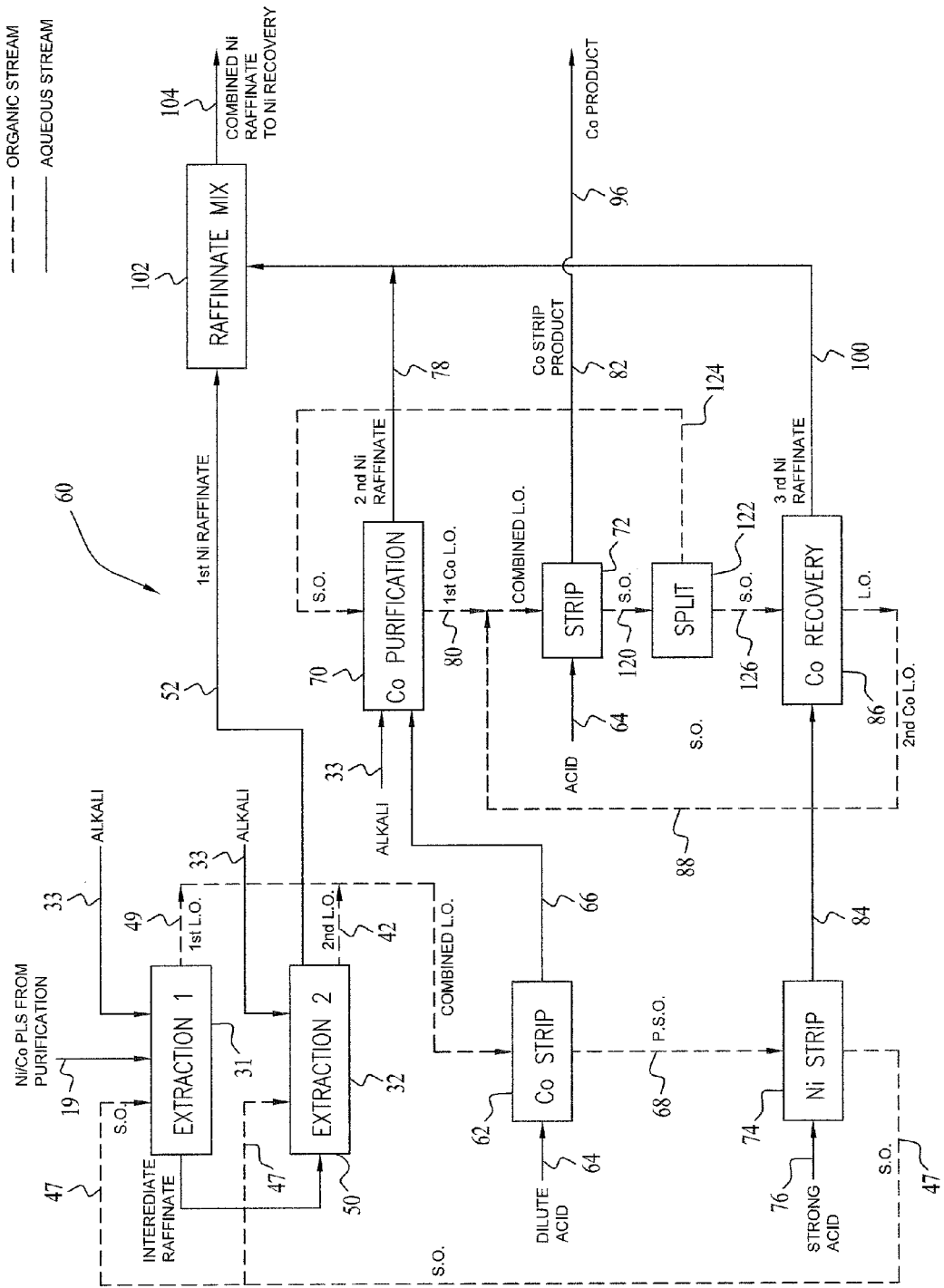
FIG. 3 is a flowsheet of another embodiment of the process with selective stripping of Co followed by Ni.

Another embodiment 60 of the process in which selective stripping of Co takes place is shown in FIG. 3. Steps that correspond with the embodiment 30 of FIG. 2 are given similar reference numerals. Again, the organic stream is shown in broken lines.

The Co and Ni from the aqueous feed solution 19 is subjected to the two solvent extractions 31 and 32 arranged in a series parallel extraction circuit. Again in this case, alkali 33 is added for pH control.

In the first extraction 31 the solution 19 is contacted with stripped organic 47 producing a loaded organic 49 and an aqueous stream (intermediate raffinate) 50 with most of the Co extracted from it.

The intermediate raffinate 50 is then subjected to the second extraction 32 where it is contacted with further stripped organic 47 to extract the remaining Co and produce a raffinate 52 with the desired Ni:Co ratio above 667:1. Again the duration of the extractions 31 and 32 is controlled, as described above.

The loaded organic 49 from the first extraction 31 is combined with the loaded organic 42 from the second extraction 32 and subjected to a Co strip 62 with dilute acid 64 designed to selectively strip Co from the loaded organic at the expense of Ni by means of mild conditions, i.e. low acid, low temperature and short retention time. Ni requires more severe conditions to be efficiently stripped, and thus it is possible to selectively strip most of the Co with minimum Ni, by choosing mild conditions.

This is achieved by careful control of the amount of acid in the dilute acidic strip solution, so that the stripping conditions have the minimum necessary acidity for efficient Co stripping. In this way, Co is selectively stripped with respect to Ni.

The Co product solution 66 coming from 62 may have a pH of about 1 to 2.5 preferably about 1.7 to 2.2.

The partly stripped organic 68 now depleted in Co, is then subjected to a Ni strip 74 with strong acid 76 under conditions suitable for Ni-stripping, producing the stripped organic 47 in which the [Ni] is reduced to about 200 to 250 mg/l. The stripped organic 47 is recycled to the extractions 31 and 32, completing the loop.

As before in the bulk stripping mode, it is not necessary to strip all of the Ni from the organic stream 68, and a certain residual level of Ni is deemed to be economically beneficial to the process.

The conditions of the Ni stripping are controlled to strip most but not all of Ni from the loaded extractant, in the same fashion as described for the previous embodiment 30, shown in FIG. 2, i.e. to achieve a target of about 200-250 mg/l [Ni] in the stripped extractant.

The aqueous product (raffinate) 66 from the Co strip 62 is purified of its Ni content by a further extraction 70, using Cyanex 272 or some other suitable Co extractant, producing a Ni containing raffinate 78. Alkali 33 is again added for pH control.

The loaded organic 80 from the extraction 70 is stripped, as shown at 72, with dilute acid 64 as before to produce a pure Co solution 82.

The stripped organic (SO) 120 from the strip 72 is split, as shown at 122, into a first stream 124 which recycled the extraction 70 and a second steam 126.

The aqueous product (raffinate) 84 from the Ni strip 74 is subjected to Co extraction 86 with the second organic stream 126 to remove residual Co, producing a loaded organic 88, which is recycled to the strip 72 for extracting Co therefrom.

The solution 82 is a Co product solution 96 which is very low in Ni and other impurities and therefore suitable for Co recovery, such as with $CoCo_3$ precipitation or some other known process.

The aqueous solution (raffinate) 100 from the Co extraction 86 is combined as shown at 102 with the raffinates 52 and 78 to produce a combined Ni raffinate 104 which is low in Co and therefore suitable for subsequent Ni recovery. These methods include as a first step precipitation as either a hydroxide (Ni hydroxide) or sulphide (NiS), which are then readily refined.

A number of known processes, including pyrometallurgical (smelting) and hydrometallurgical techniques (both acidic and alkaline) have been used on a commercial scale for this purpose. With Co already removed the remaining refining process for Ni is greatly simplified.

The invention is based on the discovery that Co can be extracted selectively from Ni, using a suitable extractant, such as a mixture of extractants, namely a carboxylic acid and a hydroxyoxime, and by taking advantage of faster extraction kinetics for Co compared to Ni.

Specifically, by using short retention times, Co can be very efficiently extracted, to achieve >97% Co extraction, whilst minimizing Ni extraction, i.e. <20% extraction.

Thus leach liquor resulting from leaching a typical Ni—Co sulphide concentrate with a Ni:Co ratio of 20:1, can be refined by the process of the invention to produce a Ni raffinate with Ni:Co ratio of about 667:1. This ratio is sufficient to produce a Ni product that satisfies LME Grade requirements for refined nickel metal, with respect to Co content.

The invention will now be further described with reference to the following examples. A summary of the Examples is given in Table 1.

TABLE 1

List of Examples

| Example # | Purpose | Conclusion |
|---|---|---|
| 1 | Limitations of known technology for extracting Co from a sulphide leach liquor containing Mg, Mn | High amounts of Mg and Mn co-extraction, leading to extremely high reagent consumption |
| 2 | As in example 1, but with more impurities present, (laterite leach liquor) | Even larger amounts of Mg and Mn co-extraction, leading to even worse reagent consumption |
| 3 | Batch mode example of the new invention on leach liquor, in one stage | 76% Co extraction could be achieved in one stage with only 5% Ni extraction, and negligible Mg or Mn extraction, with low reagent consumption |
| 4 | Batch mode example of invention using two stages of extraction | Two stages extracted >98% of Co with about 12% Ni leading to a final Ni:Co in raffinate at over 1000, well above the target. |
| 5 | Optimizing the organic composition, i.e. ratio of the two extractants | Lower Versatic 10 and higher LIX 63 concentrations produce higher Co extractions with a slight reduction in selectivity |
| 6 | Treatment of laterite leach liquor with new invention | Produces a Ni:Co ratio of 805 with low reagent consumption with only minor Mn extraction into the loaded organic stream |
| 7 | Mn Scrub for laterite leach liquors. | Mn can be successfully scrubbed from the loaded organic by a dilute Co stream at high efficiency |
| 8 | Comparison of testing methods, equipment selection and neutralization methods | Continuous operations continually produced raffinate solutions >667:1 Ni:Co with saponified organic and a pre-mix stage combined with a pipe reactor |
| 9 | Continuous Operations for Sulphide Feed | Continuous operations over a one month period showed the new invention was capable of producing LME Grade solution continuously. |
| 10 | Continuous Operations for Laterite Feed | Continuous operations continuously produced LME Grade raffinate |
| 11 | Selectively strip Co from loaded organic | The majority of the Co can be selectively stripped at low acid concentrations, short retention times and low temperature |
| 12 | Stripping Ni from the partially loaded organic | Ni can be stripped to low levels at elevated temperatures (50° C.) |

TABLE 1-continued

List of Examples

| Example # | Purpose | Conclusion |
|---|---|---|
| 13 | Continuous Co selective stripping utilizing a dilute strip solution or a concentrated strip solution | The majority of the Co can be selectively stripped at low acid concentration and O:A ratios of 5:1 |
| 14 | Continuous Ni stripping of partially loaded organic | Ni can be stripped to <0.25g/L Ni in organic. |
| 15 | Bulk stripping of loaded organic | Bulk stripping can be utilized to produce a final strip product solution with <3:1 Ni:Co |
| 16 | Continuous operations of new invention with two acid feed stripping | Co extraction was successfully achieved, two acid feeds were not successful as too much Co was present in the strip solution to combine with final raffinate |

Example 1

This example illustrates the limitations of using existing technology for extracting Cobalt from Nickel-Cobalt sulphide leach liquor, due to the effect of impurities.

A synthetic leach liquor (PLS) as shown in Table 2 was prepared from sulphate salts, and was intended to simulate leach liquor derived from leaching a typical Ni sulphide concentrate. It was extracted in a single stage with bis 2,4,4-trimethylpentyl phosphinic acid, (i.e. the commercial reagent Cyanex 272); the organic phase was made up to 10 v/v % Cyanex 272 with Shellsol 2046AR as diluent.

The objective was to extract sufficient Co from the leach liquor so that the resultant raffinate met the Co requirements for LME Grade Nickel, (Ni:Co ratio>667:1). In effect this meant >98% Co extraction was required, depending on the extent of Ni extraction. Because some extractant may be consumed by impurities (i.e. not by Co alone), the amount of extractant needed is not easily predicted; thus to cover all reasonable eventualities, four different extraction tests were carried out using different O:A ratios as shown in Table 3.

Nickel Cobalt and Impurity Extraction

The organic phase was placed in a one liter stainless steel rectangular box immersed in a water bath at 60° C. An overhead stirrer was used for mixing, and the required volume of aqueous solution was slowly added to maintain an organic continuous continuity and left to mix for 5 minutes. The pH was measured regularly and adjusted by addition of 50% sodium hydroxide to maintain pH 5.1-5.5, (the pH range that is understood to be used in commercial plants for Cyanex 272).

After 5 minutes of mixing under these conditions, the resulting emulsion was separated in a one liter separatory funnel, producing raffinate and loaded organic. Feed and product assays for each ratio are presented in Table 2.

Percent extraction of each element for each ratio is presented in Table 3.

TABLE 3

Extraction Results Example 1

| O:A Ratio | Ni:Co | Ni % | Ca % | Co % | Mg % | Mn % | g NaOH:g Co |
|---|---|---|---|---|---|---|---|
| 5:1 | 1336 | 0.2 | 3.0 | 98.6 | 72.4 | 99.6 | 25.4 |
| 3:1 | 409 | 0.1 | 0.0 | 95.3 | 41.8 | 98.1 | 17.9 |
| 1:1 | 119 | 0.1 | 0.0 | 83.4 | 16.9 | 93.2 | 8.97 |
| 0.5:1 | 59 | 0.2 | 0.0 | 66.3 | 7.7 | 85.4 | 8.78 |

Caustic consumption in each test was calculated from the aqueous Na and Co assays, and is shown as a ratio to the grams Cobalt extracted. All extractions are based on the aqueous solutions with the exception of Ni which is based on organic assay.

Conclusions

Co was extracted in all cases without any Ni extraction, but unfortunately both Mg and Mn co-extracted with the Co. Using a large excess of organic (5:1 ratio), the raffinate did finally meet the required target for Ni:Co ratio. However, much of the Mn and Mg were also loaded at this point. Consequently reagent consumption during this (5:1) test was very high at 25.4 g of NaOH/g Co which probably makes use of this reagent uneconomic for such leach solutions.

This example illustrates the fundamental difficulty facing the separation of Co from Ni in the presence of common impurities such as Mg, Mn and Ca, found in leach liquors.

TABLE 2

Feed and Product Assays Example 1

| | Aqueous | | | | | | | Organic | | | | | |
|---|---|---|---|---|---|---|---|---|---|---|---|---|---|
| O:A Ratio | Ni ppm | Ca ppm | Cl ppm | Co ppm | Mg ppm | Mn ppm | Na ppm | Ni ppm | Ca ppm | Co ppm | Mg ppm | Mn ppm | Na ppm |
| PLS/SO | 19510 | 468 | 7130 | 994 | 9984 | 474 | 1522 | 0 | 0 | 0 | 0 | 0 | 0 |
| 5:1 | 18710 | 454 | 7060 | 14 | 2751 | 2 | 16170 | 46 | 11 | 191 | 1419 | 100 | 3 |
| 3:1 | 19240 | 485 | 7220 | 47 | 5812 | 9 | 11190 | 23 | 7 | 295 | 1295 | 152 | 1 |
| 1:1 | 19650 | 525 | 7010 | 165 | 8300 | 32 | 6289 | 27 | 3 | 807 | 1749 | 460 | 0.5 |
| 0.5:1 | 19770 | 524 | 7030 | 335 | 9213 | 69 | 4484 | 40 | 3 | 1270 | 1736 | 846 | 0.5 |

Example 2

This example again illustrates the difficulties of using existing technology for extracting Cobalt from Nickel, this time from laterite leach liquors, which tend to have higher impurities than sulphide leach liquors.

Nickel, Cobalt and Impurity Extraction

A synthetic PLS as shown in Table 4 was prepared as before from sulphate salts, and was intended to simulate leach liquor derived from leaching a typical Ni laterite. Even with a 5:1 O:A ratio using 10 v/v % Cyanex 272 as before, the results were still short of the target (too much Co left in raffinate), so it was subjected to another stage.

This test was completed as a two stage series parallel test. The first stage consisted of contacting fresh organic solution and PLS solution in a similar arrangement as in Example 1. After 5 minutes under these conditions, the resulting emulsion was separated, producing raffinate and loaded organic streams.

The raffinate was still not at the target Ni:Co ratio (667:1) so was then contacted again in a $2^{nd}$ Stage with fresh organic under the same conditions, but with an O:A ratio of only 1:1.

Feed and product assays for both stages are presented in Table 4.

Conclusions

Co was again extracted preferentially over Ni, and with two stages and a large excess of organic the raffinate did finally meet the required target for Ni:Co ratio. However, virtually all of the Mn and a significant quantity of Mg were also loaded at this point. Reagent consumption during this test was calculated (from Na assays) at 36.2 g of NaOH/g Co which is very high, and indicates the difficulty with use of this reagent for such laterite leach liquors.

This example again illustrates the fundamental difficulty facing the separation of Co from Ni in the presence of common impurities such as Mg, Mn and Ca, found in leach liquors.

Example 3

This example illustrates the use of the invention for extracting cobalt from nickel-cobalt sulphide leach liquor complete with impurities such as Mg and Mn in substantial concentrations.

TABLE 4

Feed and Product Assays Example 2

| Stage | O:A Ratio | Aqueous | | | | | | | Organic | | | | | |
|---|---|---|---|---|---|---|---|---|---|---|---|---|---|---|
| | | Ni ppm | Ca ppm | Cl ppm | Co ppm | Mg ppm | Mn ppm | Na ppm | Ni ppm | Ca ppm | Co ppm | Mg ppm | Mn ppm | Na ppm |
| | PLS/SO | 7671 | 196 | 8610 | 726 | 12667 | 5,216 | 565 | 0 | 0 | 726 | 0 | 0 | 0 |
| 1 | 5:1 | 7086 | 185 | 8410 | 69 | 8905 | 162 | 11451 | 7 | 2 | 69 | 584 | 826 | 2 |
| 2 | 1:1 | 7291 | 182 | 8480 | 10 | 6750 | 7 | 15460 | 16 | 1 | 10 | 98 | 148 | 2 |

Percent extraction of each element for each stage is presented in Table 5.

TABLE 5

Extraction Results Example 2

| Stage | O:A Ratio | Ni:Co | Ni % | Ca % | Co % | Mg % | Mn % | g NaOH:g Co |
|---|---|---|---|---|---|---|---|---|
| 1 | 5:1 | 103 | 0.1 | 5.6 | 90.5 | 29.7 | 96.9 | 36.2 |
| 2 | 1:1 | 729 | 0.2 | 7.1 | 98.6 | 46.7 | 99.9 | |

All extractions are based on the aqueous solutions with the exception of Ni which is based on organic assay.

A synthetic leach liquor (PLS) as shown in Table 6 was prepared from sulphate salts. It was extracted in one stage with an organic phase containing 4.7 v/v % Versatic 10 and 14 v/v % LIX 63 with Shellsol D80 as diluent. (In this description, v/v % is with reference to the total volume of the extractants and the diluent.) As in Examples 1 and 2, the objective was to extract sufficient Co to achieve a Ni:Co ratio>667:1 in raffinate. Two separate tests were done, with different O:A ratios, 1:1 and 0.5:1.

Nickel, Cobalt and Impurity Extraction

The organic and aqueous phases were mixed in a one liter stainless steel rectangular box immersed in a water bath at 30° C. for one minute at pH 4.5. Samples were taken at 15 second intervals, and analyzed for Ni and Co in both phases.

TABLE 6

Feed Assays Example 3

| Stream | Aqueous | | | | | | | Organic | | | | | |
|---|---|---|---|---|---|---|---|---|---|---|---|---|---|
| | Ni ppm | Ca ppm | Cl ppm | Co ppm | Mg ppm | Mn ppm | Na ppm | Ni ppm | Ca ppm | Co ppm | Mg ppm | Mn ppm | Na ppm |
| PLS/SO | 20288 | 561 | 11485 | 1024 | 11527 | 425 | 256 | 0 | 0 | 0 | 0 | 0 | 0 |

Figure 4:
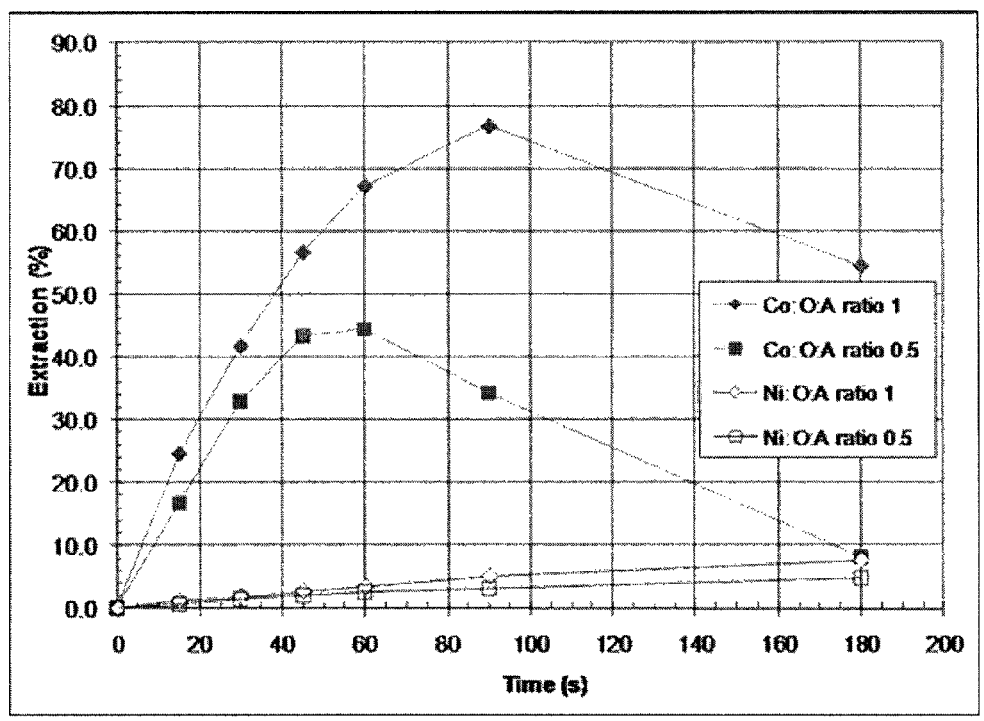
FIG. 4 is a graph showing Co and Ni extraction versus residence time for different organic:aqueous ratios.
Figure 5:
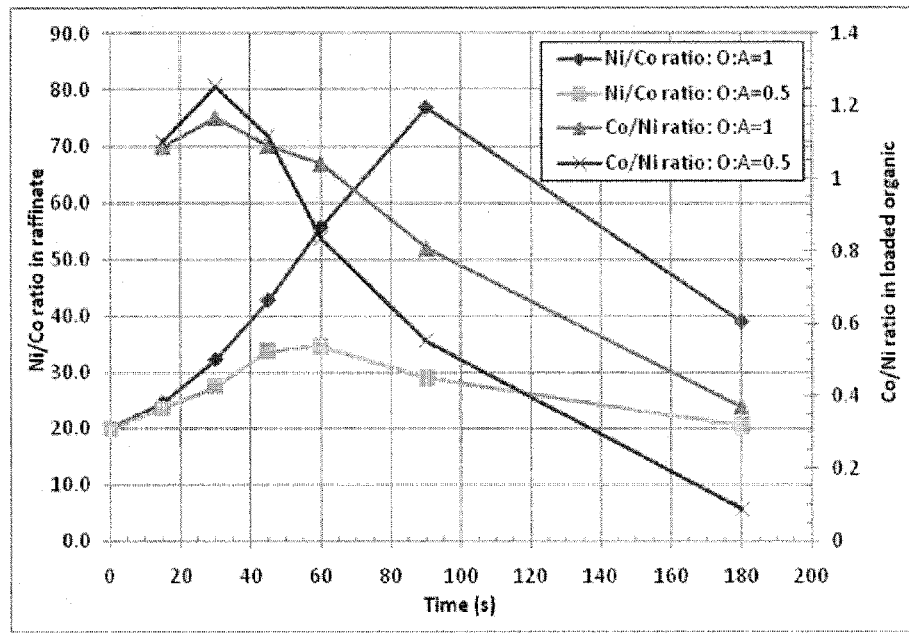
FIG. 5 is a graph showing Ni:Co ratio in the raffinate versus residence time for different organic:aqueous ratios.
Figure 6:
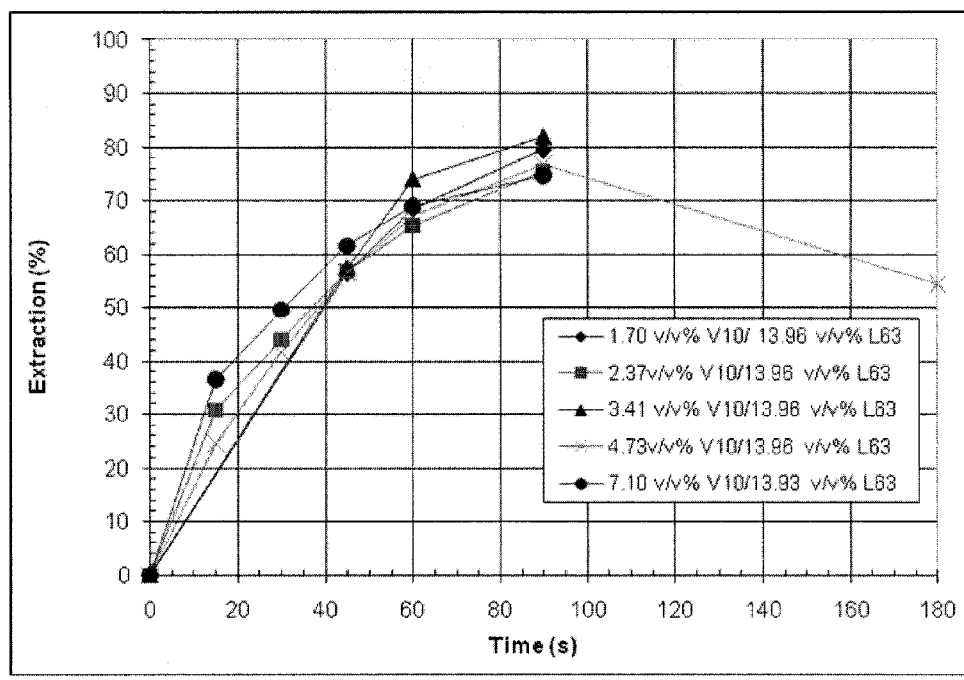
FIG. 6 is a graph illustrating the effect of Versatic 10 concentration on Co extraction.
Figure 7:
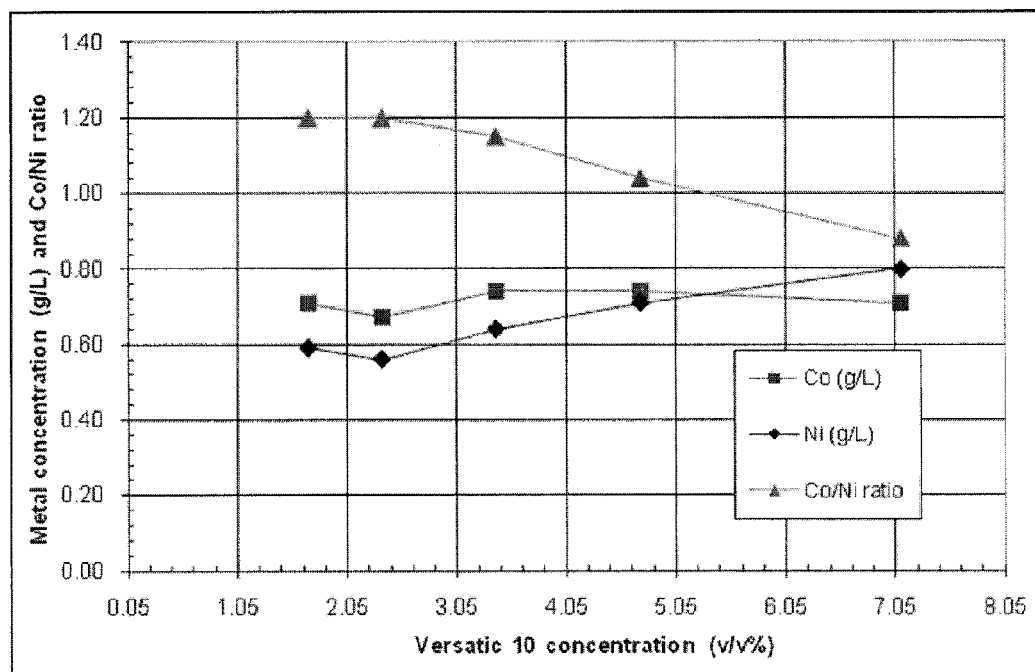
FIG. 7 is a graph illustrating the effect of Versatic 10 concentration on Co and Ni extraction at 60 seconds duration.
Figure 8:
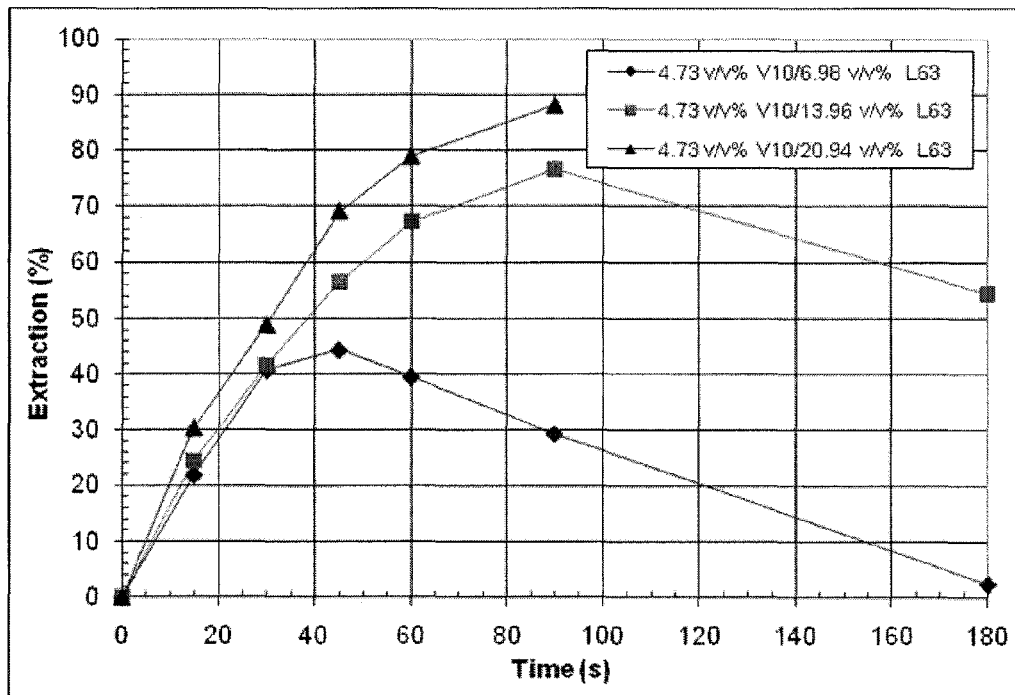
FIG. 8 is a graph illustrating the effect of LIX 63 concentration on Co extraction.

The results are presented in Table 7 and Table 8 and graphically in FIG. 4 and FIG. 5.

TABLE 7

Comparison of the Effect of O:A Ratios on Co and Ni Extraction Example 3

| O:A Ratio | Time s | Aqueous | | | Organic | | | | | |
|---|---|---|---|---|---|---|---|---|---|---|
| | | Ni ppm | Co ppm | Na ppm | Ni ppm | Ca ppm | Co ppm | Mg ppm | Mn ppm | Na ppm |
| 1 | 15 | 19558 | 768 | 595 | 229 | 4 | 249 | 5 | 2 | 3 |
|   | 30 | 19309 | 599 | 840 | 366 | 2 | 428 | 3 | 1 | 3 |
|   | 45 | 19165 | 448 | 1093 | 535 | 2 | 583 | 4 | 2 | 4 |
|   | 60 | 18871 | 339 | 1299 | 668 | 1 | 695 | 3 | 1 | 5 |
|   | 90 | 18607 | 242 | 1648 | 988 | 2 | 798 | 6 | <1 | 4 |
|   | 180 | 18033 | 463 | 1844 | 1487 | 3 | 553 | 3 | <1 | 3 |
| 0.5 | 15 | 20250 | 861 | 484 | 315 | 1 | 347 | 1 | 3 | 5 |
|   | 30 | 19704 | 718 | 679 | 562 | 1 | 705 | 2 | 2 | 4 |
|   | 45 | 19377 | 572 | 942 | 785 | 1 | 876 | 5 | 3 | 4 |
|   | 60 | 19285 | 557 | 1070 | 1071 | 2 | 895 | 5 | 1 | 4 |
|   | 90 | 19137 | 660 | 1067 | 1242 | 1 | 687 | 4 | <1 | 3 |
|   | 180 | 18744 | 921 | 1115 | 1862 | 1 | 163 | 2 | <1 | 2 |

TABLE 8

Percent Extraction Example 3

| O:A Ratio | Time s | Ni:Co Raffinate | Co:Ni Organic | Ni % | Ca % | Co % | Mg % | Mn % | g NaOH:g Co |
|---|---|---|---|---|---|---|---|---|---|
| 1 | 15 | 25 | 1.09 | 1.1 | 0.71 | 25.0 | 0.04 | 0.47 | 2.3 |
|   | 30 | 32 | 1.17 | 1.8 | 0.36 | 41.5 | 0.03 | 0.24 | 2.4 |
|   | 45 | 43 | 1.09 | 2.6 | 0.36 | 56.3 | 0.03 | 0.47 | 2.5 |
|   | 60 | 56 | 1.04 | 3.3 | 0.18 | 66.9 | 0.03 | 0.24 | 2.6 |
|   | 90 | 77 | 0.81 | 4.9 | 0.36 | 76.4 | 0.05 | 0.0 | 3.1 |
|   | 180 | 39 | 0.7 | 7.3 | 0.53 | 54.8 | 0.03 | 0.0 | 4.9 |
| 0.5 | 15 | 24 | 1.10 | 1.6 | 0.18 | 15.9 | 0.01 | 0.71 | 2.4 |
|   | 30 | 27 | 1.25 | 2.8 | 0.18 | 29.9 | 0.02 | 0.47 | 2.4 |
|   | 45 | 34 | 1.12 | 3.9 | 0.18 | 44.1 | 0.04 | 0.71 | 2.6 |
|   | 60 | 35 | 0.84 | 5.3 | 0.36 | 45.6 | 0.04 | 0.24 | 3.0 |
|   | 90 | 29 | 0.55 | 6.1 | 0.18 | 35.5 | 0.03 | 0.0 | 3.9 |
|   | 180 | 20 | 0.09 | 9.2 | 0.18 | 10.1 | 0.02 | 0.0 | 14.5 |

All extractions were based on the organic assays with the exception of Co which was based on aqueous assays.

The Co extraction was very fast and peaked at about 50 seconds at an O:A=0.5, or at 90 seconds with O:A=1.0. Ni extraction was significant, but was low in comparison to Co, so that the Ni:Co ratio in the raffinate improved by about a factor of 3.5 at the optimum time. However, this was quite insufficient to achieve the target in raffinate.

At an O:A ratio of 1:1, the maximum Ni:Co ratio in the raffinate occurred at 90 seconds while the maximum Co:Ni ratio in the organic solution occurred at about 30 seconds. At an O:A ratio of 0.5:1, the maximum Ni:Co concentration in the raffinate occurred at about 60 seconds while the maximum Co:Ni ratio in the organic solution occurred at about 30 seconds. This means that it is necessary to find the best compromise between the Ni:Co ratio in the raffinate and the Co:Ni ratio in the loaded organic.

Conclusion

The extraction of Co with the new process is very selective compared to Ni.

Co loaded quickly onto the organic until a given time whereas the Ni continued to load (with additional time) and eventually scrubbed the Co off the organic. However, the best Ni:Co ratio in the raffinate was still <80:1, a long way from the target of 667:1, but this was just with one stage of extraction. This example therefore illustrates the preference for multiple stages of extraction to achieve the desired Ni:Co ratio in the raffinate, which is achieved in the next example.

Example 4

This example illustrates another embodiment of the new process for extracting Cobalt from Nickel-Cobalt sulphide leach liquor, specifically the use of multiple stages of extraction to achieve a greater % Co extraction, and thus increase Ni:Co ratio in raffinate.

A synthetic leach liquor (PLS) as shown in Table 9 was prepared from sulphate salts, and was intended to simulate leach liquor derived from leaching a typical Ni sulphide concentrate. It was extracted in a two stage series parallel configuration with an organic phase that was made up to 4.7 v/v % Versatic 10 and 14 v/v % LIX 63 with Shellsol D80 as diluent. In series parallel mode the PLS is contacted with stripped or fresh organic resulting in a raffinate and loaded organic. The raffinate produced from the first stage of extraction is then contacted with stripped or fresh organic resulting in a final raffinate and a loaded organic. The individual product organics from both stages are combined for further processing i.e. stripping.

As in Example 3, the objective was to try to extract sufficient Co from the leach liquor to meet Co requirements for LME Grade Nickel. In this example two stages were used, and given the importance of the relative kinetics of Co extraction vs Ni, the effect of the retention time in the second stage was looked at in detail.

Nickel, Cobalt and Impurity Extraction

The organic and aqueous phases were mixed in a 1:1 O:A ratio for 60 seconds, using the same procedure as in Example 3, for the first stage of extraction. The resulting Co-depleted aqueous solution was then contacted with fresh organic solution again for another 90 seconds at an O:A ratio of 1:1 and sampled at various intervals. The pH was measured and regularly adjusted using sodium hydroxide. Product assays and percent extraction numbers are presented in Table 10 and Table 11.

TABLE 9

Feed Assays Example 4

| | Aqueous | | | | | | | Organic | | | | | |
|---|---|---|---|---|---|---|---|---|---|---|---|---|---|
| Stream | Ni ppm | Ca ppm | Cl Ppm | Co ppm | Mg ppm | Mn ppm | Na ppm | Ni ppm | Ca ppm | Co ppm | Mg ppm | Mn ppm | Na ppm |
| PLS/SO | 19573 | 551 | 11700 | 1011 | 12649 | 419 | 270 | 0 | 0 | 0 | 0 | 0 | 0 |

TABLE 10

Product Assays Example 4

| | | Aqueous | | | Organic | | | | | |
|---|---|---|---|---|---|---|---|---|---|---|
| Stage | Time s | Ni ppm | Co ppm | Na ppm | Ni ppm | Ca ppm | Co ppm | Mg ppm | Mn ppm | Na ppm |
| 1 | 60 | 18134 | 252 | 1485 | 789 | 1 | 754 | 1 | 7 | 3 |
| 2 | 15 | 17611 | 124 | 1861 | 358 | <1 | 132 | <1 | 7 | <1 |
| | 30 | 17596 | 71 | 2157 | 621 | <1 | 192 | <1 | 8 | <1 |
| | 45 | 16941 | 44 | 2261 | 826 | <1 | 216 | <1 | 3 | <1 |
| | 60 | 16831 | 26 | 2523 | 1067 | <1 | 232 | <1 | <1 | 4 |
| | 90 | 16477 | 15 | 2862 | 1404 | <1 | 249 | <1 | <1 | 19 |

TABLE 11

Percent Extraction Example 4

| Stage | Time s | Ni:Co | Ni % | Ca % | Co % | Mg % | Mn % | g NaOH:g Co |
|---|---|---|---|---|---|---|---|---|
| 1 | 60 | 72 | 4.2 | 0.2 | 75.0 | 0.0 | 1.7 | 2.8 |
| 2 | 15 | 142 | 2.0 | 0.0 | 51.5 | 0.0 | 1.7 | 3.1 |
| | 30 | 248 | 3.4 | 0.0 | 73.1 | 0.0 | 1.9 | 3.5 |
| | 45 | 385 | 4.6 | 0.0 | 83.2 | 0.0 | 0.7 | 3.6 |
| | 60 | 647 | 6.0 | 0.0 | 90.1 | 0.0 | 0.0 | 4.0 |
| | 90 | 1099 | 7.8 | 0.0 | 94.5 | 0.0 | 0.0 | 4.5 |

All extractions are based on the organic solutions with the exception of Co which is based on aqueous assay.

Conclusions 98.5% Co and 12.0% Ni were extracted in two stages with minimal co-extraction of unwanted impurities; as a result the reagent consumption was only 4.0 g of NaOH being consumed per g of Co extracted. This consumption of NaOH is >6× less than that observed in Example 1 using existing technology (for a similar solution), to achieve the target Ni:Co in the final raffinate.

This example illustrates how this invention efficiently separates Co from Ni in Ni sulphide leach liquors, and thus achieves a Ni:Co ratio sufficient for LME Grade Nickel.

Example 5

This example illustrates the use of the new process for extracting Cobalt from a Ni sulphide leach liquor, specifically the use of varied organic compositions to achieve a greater % Co extraction, and Co:Ni ratio in the organic.

The organic phase for each test was made up with LIX 63 and Versatic 10 with Shellsol D70 diluent.

The objective was to try to determine the effects on Co and Ni extraction kinetics by varying the concentration of only one extractant at a time.

Nickel and Cobalt Extraction

TABLE 12

Effect of Organic Composition for Example 5

| Feed Organic | | Loaded Organic | | Extraction | | |
|---|---|---|---|---|---|---|
| Versatic 10 v/v % | LIX 63 v/v % | Co g/L | Ni g/L | Co % | Ni % | Co:Ni Ratio |
| 4.73 | 6.98 | 0.40 | 0.61 | 20.0 | 1.52 | 0.66 |
| 4.73 | 13.96 | 0.69 | 0.67 | 67.2 | 3.42 | 1.03 |
| 4.73 | 20.94 | 0.81 | 0.81 | 81.4 | 4.06 | 1.00 |
| 1.70 | 13.96 | 0.71 | 0.59 | 68.5 | 2.90 | 1.20 |
| 2.37 | 13.96 | 0.67 | 0.56 | 65.3 | 2.80 | 1.20 |
| 3.41 | 13.96 | 0.74 | 0.64 | 72.0 | 3.20 | 1.15 |
| 4.73 | 13.96 | 0.74 | 0.71 | 72.3 | 3.50 | 1.04 |
| 7.10 | 13.96 | 0.71 | 0.80 | 68.9 | 4.00 | 0.89 |

Co extraction varied slightly with changing Versatic 10 concentration in the range of 1.70-7.10 v/v %.

An increasing trend can be observed for Ni extraction with increasing Versatic 10 concentrations resulting in a decreasing trend in the Co:Ni ratio in the organic solution which suggests that a lower Versatic 10 concentration favours a higher Co:Ni ratio. See FIGS. 6-9.

Both Co and Ni extractions increased with increasing LIX 63 concentrations from 6.98-20.94 v/v %. The Co extraction increased from 20% to 81% with a subsequent increase in Ni extraction from 1.5% to 4.06%.

Figure 9:
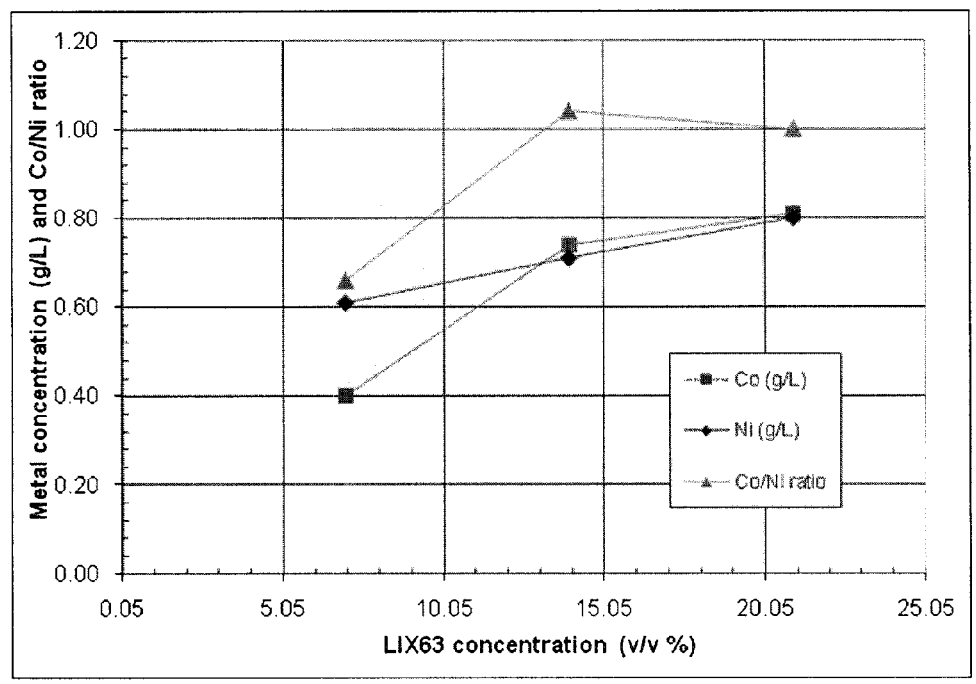
FIG. 9 is a graph illustrating the effect of LIX 63 concentration on Co and Ni extraction at 60 seconds duration.

FIG. 9 shows that increased LIX 63 concentration has the same effect on Co and Ni extraction with the selectivity of the Co:Ni in the organic slightly decreasing from 13.96-20.94 v/v %.

Conclusions

A Versatic 10 concentration of 3.41% yielded the highest Co:Ni ratio and the highest Co extraction at 60 s. An increase in LIX 63 concentration also increased the Co and Ni extraction with a slight decrease in the selectivity.

Example 6

This example illustrates the use of the new process for extracting Cobalt from a Ni—Co laterite leach liquor.

A synthetic leach liquor (PLS) as shown in Table 13 was prepared from sulphate salts, to simulate a leach liquor derived from leaching a typical Ni laterite, with increased Mg and Mn in solution, as well as a higher Co:Ni ratio, i.e. about 1:10 instead of 1:20 with sulphide leach liquor.

As in Example 4, it was extracted in a two stage series parallel configuration with an organic phase that was made up to 3.8 v/v % Versatic 10 and 19.5 v/v % LIX 63 with Shellsol D80 as diluent.

Nickel, Cobalt and Impurity Extraction

The organic and aqueous phases were mixed in a 1:1 O:A ratio, using the same procedure as in Example 4, with retention times of 120 seconds for the first stage of extraction and 151 seconds for the second stage of extraction. The pH was measured and regularly adjusted using sodium hydroxide, as before.

TABLE 13

Feed Assays Example 6

| | Aqueous | | | | | | | Organic | | | | | |
|---|---|---|---|---|---|---|---|---|---|---|---|---|---|
| Stream | Ni ppm | Ca ppm | Cl ppm | Co ppm | Mg ppm | Mn ppm | Na ppm | Ni ppm | Ca ppm | Co ppm | Mg ppm | Mn ppm | Na ppm |
| PLS/SO | 6980 | 212 | 2632 | 696 | 12200 | 4980 | 491 | 251 | 2 | 4 | <1 | <1 | <1 |

Product assays and extraction values for each stage are presented in Table 14 and Table 15.

TABLE 14

Product Assays Example 6

| | | Aqueous | | | Organic | | | | |
|---|---|---|---|---|---|---|---|---|---|
| Stage | Time s | Ni ppm | Co ppm | Na ppm | Ni ppm | Ca ppm | Co ppm | Mg ppm | Mn ppm | Na ppm |
| 1 | 120 | 6922 | 120 | 1199 | 604 | 1 | 602 | 1 | 78 | 64 |
| 2 | 151 | 6442 | 8 | 1878 | 763 | 2 | 125 | 2 | 238 | 78 |
| Combined LO | — | — | — | — | 685 | 2 | 365 | 1 | 158 | 74 |

TABLE 15

Percent Extraction Example 6

| Stage | Ni % | Ca % | Co % | Mg % | Mn % | g NaOH/g Co extracted |
|---|---|---|---|---|---|---|
| E1 | 5.1 | 0.0 | 82.8 | 0.0 | 1.6 | 3.3 |
| E2 | 7.4 | 0.0 | 93.3 | 0.0 | 4.8 | |
| Overall | 12.5 | 0.0 | 98.9 | 0.0 | 4.8 | |

All extractions are based on the organic assays with the exception of Co which is based on aqueous assay.

Conclusions

Co was preferentially extracted compared to Ni from the laterite leach liquor; despite the higher ratio of Co:Ni and the increased impurity levels in this example, the resulting raffinate again exceeded the target Ni:Co ratio, achieving 805:1.

A minor amount of Mn was co-extracted with the Co which is potential problem for a Co product. However in another embodiment of this invention it is shown that Mn on the loaded organic can be separated with a Mn scrub stage, before stripping.

The caustic consumption during this test was 3.3 g NaOH/g Co extracted, which is very low (10%) compared to the comparable test using existing technology, (Example 2). This example again illustrates how the invention allows for a more efficient separation of Co from Ni in spite of an increased level of impurities as found in laterite leach liquors.

Example 7

This example illustrates another embodiment of the invention, specifically the use of a Mn scrub stage to remove Mn from loaded organic resulting from extraction of laterite leach liquors.

The combined loaded organic used for this test was taken from the extraction circuits in a continuous pilot plant. In the pilot operations stripped organic solution (SO) and PLS solution were mixed together in the first stage of extraction, resulting in a first loaded organic stream and a first raffinate stream. The raffinate from the first stage was contacted again with a separate SO, resulting in a second loaded organic and a final raffinate. The two loaded organic streams produced from each stage of extraction were then combined as the feed organic to scrubbing; a synthetic (dilute) Co solution, as would be derived from Co stripping, was prepared from sulphate salts and used as the feed aqueous. The ratio of Mn in the loaded organic to Co in the aqueous feed solution was varied from 0.1-36:1.

The objective was to scrub the Mn from the loaded organic prior to the subsequent Co stripping stages while minimizing the amount of Co recycling to this stage.

Manganese Scrub

The organic and aqueous phases were placed in a one liter stainless steel rectangular box immersed in a temperature controlled water bath at 30° C., 1:1 O:A and allowed to mix for 180 seconds, while samples were taken at various intervals.

Figure 10:
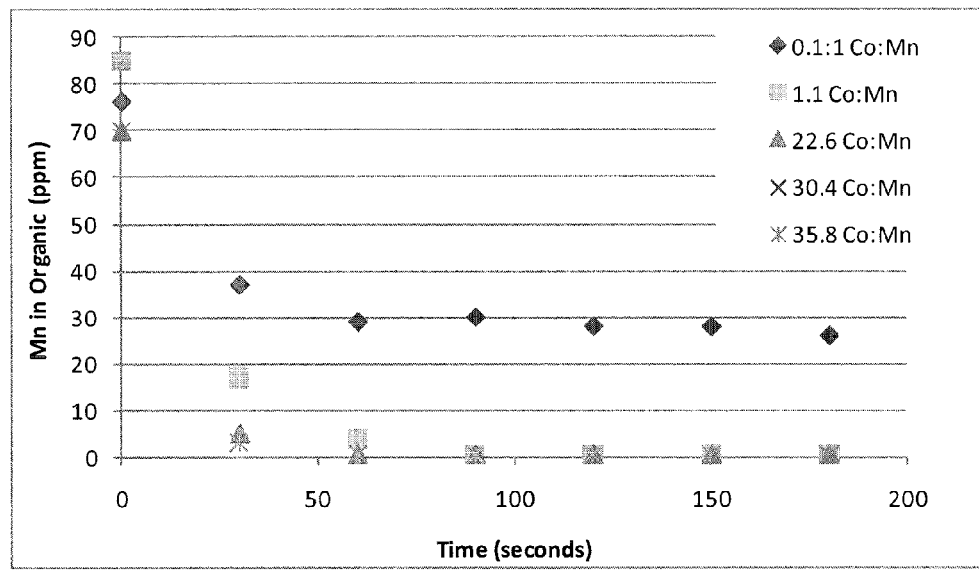
FIG. 10 is a graphical illustration showing Mn scrub results as described in Example 7.

The results for this test are presented in Table 16 below and graphically presented in FIG. 10.

TABLE 16

Feed and Product Assays for Mn Scrub Example 7

| Co:Mn Ratio in Feed | Time s | Organic | | | Aqueous | | |
|---|---|---|---|---|---|---|---|
| | | Co ppm | Mn ppm | Ni ppm | Co ppm | Mn ppm | Ni ppm |
| 22.6 | 0 | 414 | 70 | 569 | 1581 | 2 | 8 |
| | 30 | 534 | 5 | 572 | 1455 | 79 | 21 |
| | 60 | 553 | 0.5 | 570 | 1441 | 82 | 21 |
| | 90 | 569 | 0.5 | 570 | 1426 | 85 | 21 |
| 30.4 | 0 | 414 | 70 | 569 | 2125 | 0.5 | 7 |
| | 30 | 541 | 3 | 577 | 1967 | 68 | 10 |
| | 60 | 570 | 0.5 | 586 | 1960 | 74 | 9 |
| | 90 | 576 | 0.5 | 583 | 1936 | 72 | 8 |
| 35.8 | 0 | 414 | 70 | 569 | 2504 | 0.5 | 9 |
| | 30 | 573 | 3 | 604 | 2526 | 70 | 9 |
| | 60 | 608 | 0.5 | 612 | 2478 | 73 | 10 |
| | 90 | 656 | 0.5 | 641 | 2462 | 74 | 10 |
| 1.1 | 0 | 418 | 85 | 556 | 96 | 0.5 | 531 |
| | 30 | 481 | 17 | 571 | 31 | 60 | 501 |
| | 60 | 509 | 4 | 597 | 25 | 74 | 505 |
| | 90 | 500 | <1 | 587 | 21 | 80 | 525 |
| 0.1 | 0 | 444 | 76 | 614 | 11 | 0.5 | 36 |
| | 30 | 485 | 37 | 687 | 0.5 | 38 | 7 |
| | 60 | 454 | 29 | 645 | 0.5 | 42 | 4 |
| | 90 | 487 | 30 | 688 | 0.5 | 42 | 3 |
| | 120 | 473 | 28 | 674 | 0.5 | 41 | 2 |
| | 150 | 482 | 28 | 692 | 0.5 | 45 | 1 |
| | 180 | 464 | 26 | 664 | 0.5 | 44 | 0.5 |

Results showing <1 Mn as the aqueous assay are all below the ICP detection limit so for this purpose we will assume them to be zero. The test results indicated that in 90 seconds virtually all of the Mn that loads onto the organic during processing can be very efficiently scrubbed off of the organic, with only a minimum quantity of Co required in scrub aqueous feed solution. The ratio of Co:Mn in scrub aqueous product was low at about 1:4, indicating a minimum use of Co for this operation, and hence good possibilities for recycle of this stream. Essentially all of the Mn in LO was replaced by Co, which then would proceed to Co stripping, thus making full use of the Co feed to scrubbing.

Conclusions

A small portion of the strip solution produced when selectively stripping Co from the loaded organic can be efficiently utilized to scrub the Mn from solution allowing a Co rich product to be made without the Mn impurity present. The resulting (Mn-bearing) aqueous solution from this stage can be recycled to the front end of the process, with minimal Co recycle.

Example 8

The example summarizes the testwork in testing the new process.

Nickel, Cobalt and Impurity Extraction

The feed assays for each of the test examples are presented in Table 17.

TABLE 17

Feed Assays for PLS and SO Streams Example 8

| | Aqueous | | Organic | |
|---|---|---|---|---|
| Feed # | Ni ppm | Co ppm | Ni ppm | Co ppm |
| 1 | 20477 | 1116 | 0 | 0 |
| 2 | 21341 | 1163 | 0 | 0 |
| 3 | 25280 | 1111 | 0 | 0 |
| 4 | 20300 | 1060 | 0 | 0 |
| 5 | 18199 | 964 | 0 | 0 |
| 6 | 19930 | 1058 | — | — |
| 7 | 20199 | 1008 | 0 | 0 |
| 8 | 25884 | 1341 | 0 | 0 |
| 9 | 22400 | 1180 | — | — |
| 10 | 19320 | 1020 | — | — |
| 11 | 20403 | 1039 | 206 | 3 |

Testwork on the new invention was completed in three distinct phases. The first phase consisted of batch testwork where all tests were completed with the same procedure as Example 3. The second phase consisted of continuous testwork which was operated in either a mixer/settler system or pipe reactor system.

Another key operating parameter addressed during the testwork was the method of neutralization. Neutralization is required during extraction to aintain the pH in the desired range. This must be done by adding a neutralization agent such as caustic.

Three methods of neutralization were tested during the course of the testwork.

The three methods tested were:
1. Continuous pH control (pH Control)—caustic was added continuously to the emulsion in the mixer to maintain a pH value of 4.5 in both stages of extraction
2. Saponification (Sapon.)—a set amount of caustic was added and mixed with the organic phase prior to contact with the aqueous phase to maintain a desired pH exiting the pipe reactor
3. Partial Saponification and pH control (Partial Sapon.)—a set amount of caustic (but insufficient), was added to the organic phase prior to mixing with the aqueous phase and additional caustic was also added to the mixer to maintain the desired pH in the settler discharge raffinate.

The continuous pH control method was used throughout a large portion of the batch testing and through continuous testing of the mixer/settler system. This method was abandoned during continuous phase testing when it became apparent that a pipe reactor was required to reach the target Ni:Co ratio in the final raffinate.

Table 18 highlights 12 various tests utilizing different equipment and pH control methods.

TABLE 18

Procedures and Assays of Feed and Product Streams for Example 8

| Test # | Feed # | Mode of Operation | Equipment Used | Neut. Method | E1/E2 Time (s) | Aqueous Ni ppm | Aqueous Co ppm | Organic Ni ppm | Organic Co ppm |
|---|---|---|---|---|---|---|---|---|---|
| 1 | 1 | Batch | Batch | pH Control | 60 | 19380 | 279 | 978 | 838 |
|   |   |       |       |            | 75 | 17633 | 28  | 1620 | 264 |
| 2 | 2 | Batch | Batch | pH Control | 90 | 20857 | 428 | 1800 | 715 |
|   |   |       |       |            | 90 | 18458 | 57  | 1374 | 332 |
| 3 | 3 | Batch | Batch | Partial Sapon. | 120 | 19233 | 290 | 773 | 724 |
|   |   |       |       |                | 120 | 16523 | 24  | 1270 | 256 |
| 4 | 4 | Cont. | M/S | pH Control | 60 | — | — | — | — |
|   |   |       |     |            | 60 | 22800 | 169 | — | — |
| 5 | 5 | Cont. | M/S | pH Control | 120 | 16874 | 429 | 763 | 674 |
| 6 | 6 | Cont. | M/S | Sapon. | 90 | 18400 | 366 | — | — |
|   |   |       |     |        | 60 | 18020 | 174 | — | — |
| 7 | 7 | Cont. | M/S | Sapon. | 90 | 17815 | 526 | 812 | 582 |
| 8 | 8 | Cont. | M/S | Partial Sapon. | 90 | 22181 | 680 | 607 | 548 |
|   |   |       |     |                | 90 | 20779 | 316 | 837 | 345 |
| 9 | 9 | Cont. | P/R | Sapon. | 90 | 20300 | 198 | — | — |
|   |   |       |     |        | 30 | 19300 | 63  | — | — |
| 10 | 10 | Cont. | PM & P/R | Sapon. | 15 + 90 | 18630 | 200 | 1370 | 740 |
|    |    |       |          |        | 6 + 30  | 16680 | 23  | 1490 | 192 |
| 11 | 11 | Cont. | PM & P/R | Sapon. | 15 + 90 | 18311 | 146 | 2180 | 945 |
|    |    |       |          |        | 6 + 75  | 17259 | 28  | 1575 | 150 |

Cont. = Continuous Operations, M/S = Mixer/Settler, P/R = Pipe Reactor and PM = Pre-Mixer The extraction results and Ni:Co ratios in the final raffinate for each of the 12 example tests are presented in Table 19.

TABLE 19

Extraction Results for Example 8

| Test # | Equipment Used | Neut. Method | Ni:Co Raffinate | Ni % | Co % |
|---|---|---|---|---|---|
| 1 | Batch | pH Control | 629 | 12.7 | 98.7 |
| 2 | Batch | Partial Saponification | 688 | 10.4 | 97.6 |
| 3 | M/S | pH Control | 59 | 8.9 | 69.8 |
| 4 | M/S | pH Control | 39 | 4.2 | 55.2 |
| 5 | M/S | Saponification | 104 | 12.5 | 83.6 |
| 6 | M/S | Saponification | 43 | 4.4 | 45.8 |
| 7 | M/S | Partial Saponification | 66 | 5.6 | 76.4 |
| 8 | P/R | Saponification | 306 | 23.2 | 94.7 |
| 9 | PM & P/R | Saponification | 83 | 3.6 | 78.1 |
|   |          |                | 713 | 9.6 | 89.0 |
| 10 | PM & P/R | Saponification | 616 | 16.7 | 97.3 |

M/S = Mixer/Settler,
P/R = Pipe Reactor and
PM = Pre-Mixer

Test 1 was completed on a batch basis using pH control as the neutralization method. The best results achieved using the pH control method, indicated that a Ni:Co ratio of 629 with 12.7% Ni and 98.7% Co extraction could be achieved. Partial Saponification was then tested as shown in Test No. 2 and the target Ni:Co ratio in the final raffinate (>667:1) was met with less Ni extraction.

Tests 4-7 were all completed on a mixer/settler system in continuous mode. The variable tested during this phase of testwork was the method of neutralizing the organic. None of these methods of neutralization proved effective in a mixer/settler system and the end of result of a final raffinate target of 667:1 Ni:Co was not met.

Since mixer/settlers could not come close to duplicating the results achieved during the batch test work, a pipe reactor was tested to try and achieve a plugged flow system with hopes of duplicating and exceeding the results achieved during the batch testing phase. The first test completed which used a pipe reactor is shown in Test No. 8. The pipe reactor consisted of two pumps and tubing in which if the Reynolds number reached would be 6000. This turbulence should have been enough to mix the two phases however due to the high capacity of the two peristaltic pumps to obtain the high turbulence the system was not stable, suggesting that it would be difficult to optimize the pipe reactor with these pumps. Due to the small tubing used (8 mm inner diameter) pH control could not be used throughout this test as it would have proved to be too difficult to have multiple caustic addition point across the length of the pipe.

Saponification was used as the method of choice for neutralizing the organic prior to contact with the aqueous solution (PLS) to produce an end raffinate with a pH of 4.5. The results achieved from this test indicated a trend towards those seen during the bench phase with a Ni:Co ratio of 306, with high Ni extraction which would need to be overcome.

Tests 9-10 show the use of a pre-mix stage prior to the pipe reactor. This pre-mix stage was added to obtain good mixing and to enable the dispersion to keep throughout the pipe reactor. The use of the pre-mix stage allowed for the dispersion to be consisted throughout the desired retention time and to achieve the desired Ni:Co in the raffinate.

Conclusions

A Ni:Co ratio of >667:1 can be used with a combination of saponified organic, pre-mix stage and a pipe reactor. This example illustrates how this invention efficiently separates Co from Ni in Ni sulphide leach liquors, and thus achieves a Ni:Co ratio sufficient for LME Grade Nickel.

Example 9

The following example illustrates the continuous results using the new process for treating a nickel-cobalt sulphide feed solution. The data for this test is the averaged data that was taken when operating the new process integrated with a hydrometallurgical process for the recovery of Cu and Ni from a bulk sulphide concentrate over a one month period.

Cobalt Extraction

The extraction system consisted of two trains in a series-parallel configuration where the PLS flowed through each of the two mixers/pipe reactors/settlers in series, and the organic flowed through in parallel, both at 439 mL/min. That is, freshly saponified organic entered each of the two trains independently, and after a single pass through an extraction stage, recombined in the Loaded Organic Tank. Due to the small scale used during this phase of testing, pre-mix boxes were used prior to the in-line mixer/pipe reactor to increase the aqueous/organic dispersion in the tubing. E1 pre-mix box had a retention time of 15 seconds and a pipe reactor/inline mixer (pipe reactor consisted of 8 mm Tygon tubing with a PVC inline mixer of ½" diameter×11" long) with a total retention time of 105 seconds, whereas the E2 mixer had a retention time of 6 seconds and a pipe reactor/inline mixer retention of 105 seconds. The raffinate produced from the second stage has a Ni:Co ratio ≥667:1 which is sent to the Nickel Hydroxide Precipitation circuit. The loaded organics from each stage are combined and sent through the strip circuit. The pH of the extraction circuit was monitored regularly, and controlled in the target range of 3.9-4.1 for the first stage and 4.1-4.3 for the second stage by caustic addition to the stripped organic utilizing 30% NaOH solution making saponified organic. The operating parameters for the extraction stages are presented in Table 20.

TABLE 20

Operating Parameters for Example 9

| Parameter | Units | E1 | E2 |
|---|---|---|---|
| Temp | ° C. | 30 | 30 |
| External O:A | — | 1:1 | 1:1 |
| Mixer O:A | — | 1:1 | 1:1 |
| Mixer PC | — | A/C | A/C |
| Mixer RT | S | 15 | 6 |
| In-line Mixer RT | S | 105 | 105 |
| Settler RT | Min | 9.8 | 9.8 |

PC = phase continuity,
RT = retention time,
A/C = aqueous continuous,
O/C = organic continuous.

The feed and product solutions for the series parallel extraction stages are presented in Table 21 and Table 22.

TABLE 21

Feed Assays for Example 9

| | Aqueous | | | | | | | Organic | | | | | |
|---|---|---|---|---|---|---|---|---|---|---|---|---|---|
| Stream | Ni ppm | Ca ppm | Cl ppm | Co ppm | Mg ppm | Mn ppm | Na ppm | Ni ppm | Ca ppm | Co ppm | Mg ppm | Mn ppm | Na ppm |
| PLS/SO | 21211 | 602 | 7918 | 780 | 109 | 4128 | 897 | 189 | 1 | 3 | <1 | <1 | 1186 |

TABLE 22

Product Assays for Example 9

| | Aqueous | | | Organic | | | | | |
|---|---|---|---|---|---|---|---|---|---|
| Stage | Ni ppm | Co ppm | Na ppm | Ni ppm | Ca ppm | Co ppm | Mn ppm | Mg ppm | Na ppm |
| 1 | 19938 | 222 | 2631 | 1394 | 1 | 589 | 3 | <1 | <1 |
| 2 | 17658 | 24 | 4506 | 2150 | 1 | 222 | 3 | <1 | <1 |

The extraction results achieved for continuous operations are presented in Table 23.

TABLE 23

Extraction Results Example 9

| Stage | Ni % | Ca % | Co % | Mg % | Mn % | g NaOH/g Co extracted |
|---|---|---|---|---|---|---|
| 1 | 5.7 | 1.2 | 71.5 | 0 | 4.6 | 8.3 |
| 2 | 9.8 | 0.2 | 89.2 | 0 | 0 | |
| Overall | 15.5 | 1.3 | 96.9 | 0 | 1.8 | |

Conclusions

The new invention successfully extracted Co in two stages and produced a raffinate with a Ni:Co ratio of 735:1 with minimal co-extraction of impurities.

Example 10

The following example illustrates the use of the new process for extracting Co from a nickel-cobalt laterite feed solution in continuous mode.

Nickel, Cobalt and Impurity Extraction

The same series parallel extraction was used for this example that was used for example 8, with sulphide leach liquor. However, the retention times used were slightly different with the first stage of extraction had a 6 seconds pre-mix time and 114 seconds retention time in the inline mixer and the second stage of extraction had 15 seconds pre-mix time and 136 seconds in the inline mixer. The feed and product solutions for the series parallel extraction stages are presented in Table 24 and Table 25.

TABLE 24

Feed Assays for Continuous Laterite Feed Operations Example 10

| | Aqueous | | | | | | | Organic | | | | | |
|---|---|---|---|---|---|---|---|---|---|---|---|---|---|
| Stream | Ni ppm | Ca ppm | Cl ppm | Co ppm | Mg ppm | Mn ppm | Na ppm | Ni ppm | Ca ppm | Co ppm | Mg ppm | Mn ppm | Na ppm |
| PLS/SO | 7220 | 202 | 2632 | 780 | 1591 | 966 | 674 | 148 | 1 | 3 | <1 | <1 | <1 |

TABLE 25

Product Assays for Continuous Laterite Feed Operations Example 10

| | Aqueous | | | Organic | | | | | |
|---|---|---|---|---|---|---|---|---|---|
| Stage | Ni ppm | Co ppm | Na ppm | Ni ppm | Ca ppm | Co ppm | Mn ppm | Mg ppm | Na ppm |
| 1 | 6870 | 110 | 1585 | 611 | 1 | 613 | 58 | 1 | 107 |
| 2 | 6103 | 6 | 2216 | 798 | <1 | 109 | 135 | 1 | 105 |

The extraction results achieved during these tests are presented in Table 26.

TABLE 26

Extraction Results for Continuous Laterite Feed Operations Example 10

| Stage | Ni % | Ca % | Co % | Mg % | Mn % | g NaOH/g Co extracted |
|---|---|---|---|---|---|---|
| E1 | 6.4 | 0.0 | 84.1 | 0.0 | 0.6 | 3.4 |
| E2 | 9.5 | 0.0 | 94.8 | 0.0 | 3.6 | |
| Overall | 15.9 | 0.0 | 99.1 | 0.0 | 2.2 | |

Conclusions

The new process successfully removed >99.1% of Co in two stages of extraction, and thus produced a raffinate with a Ni:Co ratio of 1017:1. There was a minor amount of extraction of Mn which can be readily scrubbed from the organic as shown in Example 7. The caustic consumption of 3.4 g NaOH per g Co is very low, and partly reflects the lower Ni:Co ratio in the PLS, compared to Example 9.

Example 11

This example illustrates another embodiment of the invention, i.e. selectively stripping Co from the loaded organic stream (containing Ni+Co), that was produced in the extraction stages.

Cobalt Selective Stripping

The fresh organic solution containing 4.7 v/v % Versatic 10 and 14 v/v % LIX 63 in Shellsol D70 was contacted with fresh aqueous solution (PLS) at pH 4.5, 30° C. and on O:A ratio of 1:1 for 60 seconds resulting in the loaded organic solution for this test.

Figure 11:
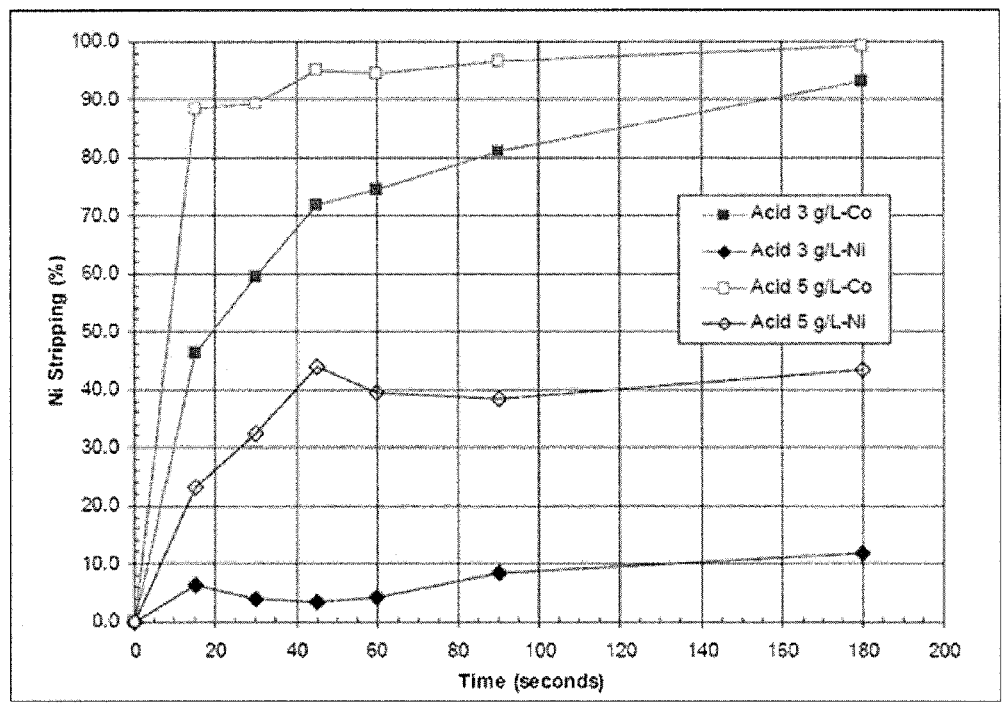
FIG. 11 is a graphical illustration showing the stripping kinetics of Co and Ni using 3 and 5 g/l sulphuric acid.

Two separate stripping tests were carried out, with varying feed acid into the strip. The loaded organic solution was stripped with aqueous solutions containing either 3 or 5 g/L $H_2SO_4$ at an O:A ratio of 1:1 and 30° C. for 180 seconds; samples were taken at intervals to examine the stripping kinetics. The strip solutions also contained 0.2M $NaS_2O_4$ so as to increase the ionic strength of the strip solution, and thus improve phase separation. The results of these tests are shown in Table 27 and FIG. 11.

The objective of this test was to produce a strip product solution with a Co:Ni ratio of 1:1 or greater.

TABLE 27

Co and Ni Stripping Kinetics with 3 and 5 g/L Sulphuric Acid Example 11

| | | Organic | | Strip Liquor | | | Stripping | |
|---|---|---|---|---|---|---|---|---|
| Acid g/L | Time s | Co (g/L) | Ni (g/L) | Co (g/L) | Ni (g/L) | Co:Ni | Co (%) | Ni (%) |
| 3 | 0 | 0.739 | 0.975 | 0 | 0 | — | — | — |
| | 15 | 0.397 | 0.914 | 0.342 | 0.061 | 5.6 | 46.3 | 6.27 |
| | 30 | 0.300 | 0.937 | 0.439 | 0.038 | 11.6 | 59.4 | 3.86 |
| | 45 | 0.208 | 0.942 | 0.531 | 0.033 | 16.1 | 71.9 | 3.36 |
| | 60 | 0.189 | 0.933 | 0.550 | 0.042 | 13.1 | 74.4 | 4.30 |
| | 90 | 0.140 | 0.892 | 0.599 | 0.083 | 7.2 | 81.0 | 8.48 |
| | 120 | 0.096 | 0.862 | 0.643 | 0.113 | 5.7 | 87.0 | 11.5 |
| | 180 | 0.051 | 0.858 | 0.688 | 0.117 | 5.9 | 93.1 | 12.0 |
| 5 | 0 | 0.711 | 0.756 | 0 | 0 | — | — | — |
| | 15 | 0.088 | 0.607 | 0.603 | 0.159 | 3.79 | 89.6 | 19.7 |
| | 30 | 0.080 | 0.533 | 0.608 | 0.127 | 4.79 | 88.7 | 29.4 |
| | 45 | 0.038 | 0.441 | 0.630 | 0.146 | 4.32 | 94.6 | 41.6 |
| | 60 | 0.041 | 0.478 | 0.642 | 0.148 | 4.34 | 94.3 | 36.7 |
| | 90 | 0.025 | 0.487 | 0.675 | 0.138 | 4.89 | 96.4 | 35.6 |
| | 180 | 0.006 | 0.447 | 0.696 | 0.166 | 4.19 | 99.1 | 40.9 |

At 5 g/L sulphuric acid at 1:1 and 30° C., nearly 90% Co was stripped in 15 seconds and 95% in 60 seconds, indicating very fast Co stripping kinetics. The Ni stripping kinetics was much slower with only 40% being stripped in 60 seconds and then the stripping efficiency leveled off.

At 3 g/L sulphuric acid, the Co stripping kinetics was slower than with 5 g/L sulphuric acid, but it was more selective. In 60 seconds, 74% Co and only 4% Ni were stripped, leading to a Co:Ni ratio in aqueous product of 13:1. At 3 minutes, over 93% Co and 12% Ni were stripped, with a product of 6:1 ratio. This indicates that selective stripping of Co over Ni was much more effective using lower acidity strip solution than higher acidity strip solution.

Conclusions

The majority of Co can be easily and selectively stripped from Ni-bearing loaded organic at low acid concentrations, low temperatures and short retention times.

Example 12

This example illustrates the effect of temperature on the stripping kinetics for stripping Ni from the Co-depleted organic produced in the Co selective stripping stage.

Nickel Stripping

Figure 12:
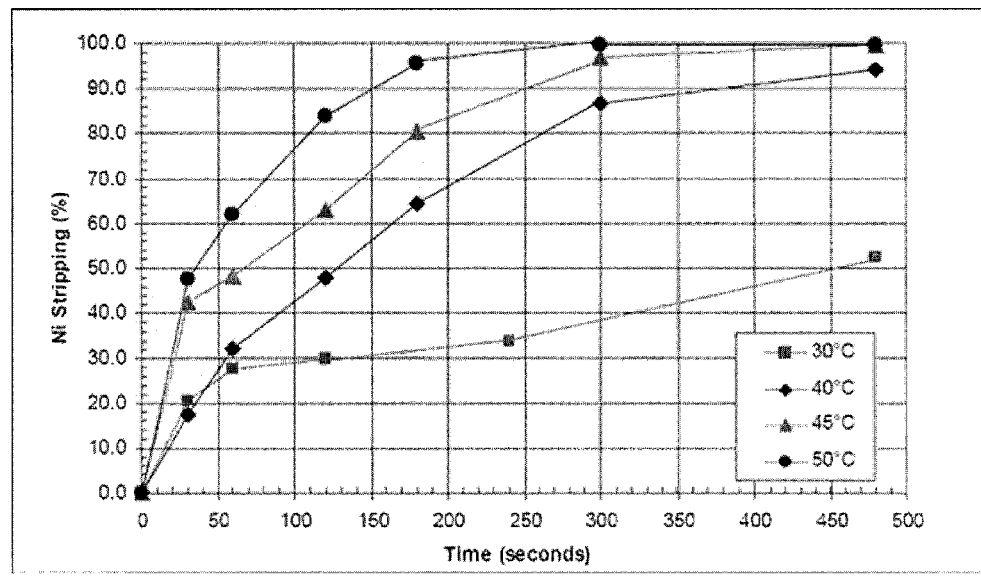
FIG. 12 is a graphical illustration showing the stripping kinetics of Ni at varying temperatures.

The loaded organic solution containing 4.7 v/v % Versatic 10 and 14 v/v % LIX 63 in Shellsol D70 was first selectively stripped of the majority of the Co prior to this example. The Co-depleted loaded organic solution was stripped with 50 g/L $H_2SO_4$ at an O:A ratio of 1:1 and temperatures of 30, 40, 45 and 50° C. The stripping kinetics for these tests is shown in Table 28 and FIG. 12.

TABLE 28

Ni Stripping Kinetics at Varying Temperatures Example 1216

| Temperature °C. | Time s | Loaded Organic Co (g/L) | Loaded Organic Ni (g/L) | Stripped Organic Co (g/L) | Stripped Organic Ni (g/L) | Stripping Co (%) | Stripping Ni (%) |
|---|---|---|---|---|---|---|---|
| 30 | 0 | — | 1.212 | — | — | — | — |
|  | 30 | — | 1.212 | — | — | — | 20.7 |
|  | 60 | — | 1.212 | — | — | — | 27.6 |
|  | 120 | — | 1.212 | — | — | — | 29.7 |
|  | 180 | — | 1.212 | — | — | — | — |
|  | 240 | — | 1.212 | — | — | — | 33.8 |
|  | 300 | — | 1.212 | — | — | — | — |
|  | 480 | — | 1.212 | — | — | — | 52.4 |
| 40 | 0 | — | 1.212 | — | — | — | — |
|  | 30 | — | 1.212 | — | 0.862 | — | 17.4 |
|  | 60 | — | 1.212 | — | 0.810 | — | 32.2 |
|  | 120 | — | 1.212 | — | 0.589 | — | 47.9 |
|  | 180 | — | 1.212 | — | 0.341 | — | 64.5 |
|  | 240 | — | 1.212 | — | — | — | — |
|  | 300 | — | 1.212 | — | 0.001 | — | 86.8 |
|  | 480 | — | 1.212 | — | 0.001 | — | 94.2 |
| 45 | 0 | 0.125 | 1.175 | — | — | — | — |
|  | 30 | 0.125 | 1.175 | 0.022 | 0.674 | 82.1 | 42.6 |
|  | 60 | 0.125 | 1.175 | 0.020 | 0.609 | 83.8 | 48.2 |
|  | 120 | 0.125 | 1.175 | 0.017 | 0.435 | 86.2 | 63.0 |
|  | 180 | 0.125 | 1.175 | 0.015 | 0.228 | 88.2 | 80.6 |
|  | 240 | 0.125 | 1.175 | — | — | — | — |
|  | 300 | 0.125 | 1.175 | 0.012 | 0.035 | 90.8 | 97.0 |
|  | 480 | 0.125 | 1.175 | 0.009 | 0.005 | 93.2 | 99.6 |
| 50 | 0 | 0.123 | 1.210 | — | — | — | — |
|  | 30 | 0.123 | 1.210 | 0.013 | 0.633 | 89.6 | 47.5 |
|  | 60 | 0.123 | 1.210 | 0.009 | 0.455 | 92.4 | 62.1 |
|  | 120 | 0.123 | 1.210 | 0.007 | 0.183 | 94.1 | 84.1 |
|  | 180 | 0.123 | 1.210 | 0.006 | 0.053 | 95.3 | 95.7 |
|  | 240 | 0.123 | 1.210 | — | — | — | — |
|  | 300 | 0.123 | 1.210 | 0.005 | 0.006 | 96.0 | 99.6 |
|  | 480 | 0.123 | 1.210 | 0.005 | 0.007 | 96.2 | 99.6 |

This test indicates the Ni stripping efficiency is very temperature dependant. After 5 minutes of stripping, the Ni stripping efficiency increased from 86.8% at 40° C. to 97% at 45° C. and further to 99.6% at 50° C.

Conclusions

The Ni can be stripped down to very low levels at high temperatures. The half life of LIX 63 at 45° C. and 50° C. under these strip conditions could be over 1.5 years and over 1 year respectively. Therefore, stripping at higher temperature can be an option for complete Ni stripping.

Example 13

This example illustrates the use of selectively stripping Co from the loaded organic in continuous mode, with varying acid concentration and volume.

Cobalt Selective Stripping

The loaded organic solution contained 3.8 v/v % Versatic 10 and 19.5 v/v % LIX 63 in Shellsol D70 and was produced from continuous extraction operations. The loaded organic solution was stripped with acid at 30-34° C. in two different arrangements:

a) With a relatively large volume of dilute strip solution or
b) With a small volume of more concentrate acid strip solution.

The results from these tests are presented in Table 29. The objectives included producing a strip product solution with a Co:Ni ratio of 1:1 or greater, maximize Co stripping, with a maximum [Co] and minimum acidity (for greater ease of Co recovery downstream).

TABLE 29

Co and Ni Stripping Results with 10-40 g/L Sulphuric Acid Example 13

| Test No | O:A Ratio | Temp °C. | Time s | Acid g/L | Organic Feed Co (g/L) | Organic Feed Ni (g/L) | Strip Liquor Co (g/L) | Strip Liquor Ni (g/L) | Co:Ni | Stripping Co (%) | Stripping Ni (%) |
|---|---|---|---|---|---|---|---|---|---|---|---|
| 1 | 5:1 | 30 | 4 | 10 | 0.669 | 1.49 | 0.606 | 0.154 | 3.9 | 94.6 | 18.5 |
| 2 | 5:1 | 32 | 4 | 10 | 0.466 | 1.28 | 1.37 | 0.709 | 1.9 | 92.0 | 16.3 |
| 3 | 5:1 | 33 | 4 | 10 | 0.488 | 1.62 | 2.18 | 0.760 | 2.9 | 86.4 | 11.5 |
| 4 | 5:1 | 34 | 5 | 10 | 0.558 | 1.67 | 2.22 | 0.876 | 2.5 | 87.2 | 10.2 |
| 5 | 5:1 | 34 | 5 | 10 | 0.516 | 1.38 | 2.15 | 1.03 | 2.1 | 85.3 | 2.3 |
| 6 | 20:1 | 34 | 4 | 40 | 0.515 | 1.65 | 5.55 | 2.82 | 2.0 | 85.1 | 9.8 |
| 7 | 24:1 | 30 | 5 | 40 | 0.406 | 1.66 | 7.12 | 3.25 | 2.2 | 74.2 | 0.0 |
| 8 | 25:1 | 31 | 4 | 40 | 0.494 | 1.66 | 7.72 | 3.11 | 2.5 | 82.6 | 2.4 |
| 9 | 20:1 | 32 | 4 | 40 | 0.533 | 1.87 | 7.35 | 3.46 | 2.1 | 85.0 | 13.0 |
| 10 | 20:1 | 31 | 4 | 40 | 0.495 | 1.36 | 6.91 | 2.58 | 2.7 | 83.8 | 6.9 |

Co strip efficiency was in the range of 85-94% with a strip O:A ratio of 5:1 using a strip solution containing 10 g/L sulphuric acid. The Co strip efficiency decreased to a range of 82-85% in most cases with a strip O:A ratio of 20:1 using a strip solution containing 40 g/L sulphuric acid. The Co:Ni ratio increased from a range of 0.25-0.36 in the loaded organic to 2.0-2.9 in the strip liquor in most cases. This means that after the Co selective stripping the target of a Co:Ni ratio of 1 in the strip liquor was easily achieved.

Conclusions

The majority of Co was selectively stripped from Ni at low acid concentrations and O:A ratios of 5:1. It also suggests that it might be possible to further limit the Ni stripping (in this Co Strip) by running a two stage counter-current strip by running the conditions set out in Test Number 7 which indicated no co-stripping of the Ni with the Co.

Example 14

This example illustrates the continuous mode of stripping Ni from the Co-depleted organic produced from the Co selective stripping stage.

Ni Stripping

The Co-depleted organic used for this test came from the Co selective stripping stage as described in the previous example. As in the previous example, the volume and acidity of the strip solution was varied.

The Co-depleted organic solution was stripped with a strip solutions containing 10-80 g/L $H_2SO_4$ at an O:A ratio of 3-29:1 and 45-53° C. The results from these tests are presented in Table 30. The objective of this test was to produce a stripped organic solution with a residual Ni concentration of <0.25 g/L to limit the effects on the subsequent extraction stages, as well as attempting to make a Ni strip solution with a maximum [Ni] in minimum volume, etc as before for Co.

The objective of this test was to produce a strip organic solution with a residual Ni concentration of <0.25 g/L to limit the effects on the subsequent extraction stages, as well as attempting to make a Ni strip solution with maximum [Ni] in minimum volume, etc as before for Co.

Conclusions

Stripping the co-depleted organic solution to less than 0.25 g/L Ni can be achieved, to produce a concentrated Ni solution of about 20 g/l Ni, with a pH value of <1.

Example 15

This example illustrates the use of bulk strip with a final Co/Ni product solution.

Cobalt and Nickel Stripping

The loaded organic solution contained 3.8 v/v % Versatic 10 and 19.5 v/v % LIX 63 in Shellsol D70 and was produced from continuous extraction operations. The loaded organic solution was stripped at two different O:A ratios while maintaining the strip solution at 80 g/L $H_2SO_4$ in a three stage counter current operation, as shown in FIG. 2. The results from these tests are presented in Table 31.

The objective of these tests was to produce a final Co PE possessing a <4:1 Ni:Co ratio while ensuring a Co PE free acid content of <1.0 g/L. It was also imperative that the final

TABLE 30

Co and Ni Stripping Results with 10-80 g/L Sulphuric Acid Example 14

| Test No | O:A Ratio | Temp °C. | Time s | Acid g/L | Organic In Co (g/L) | Organic In Ni (g/L) | Organic Out Co (g/L) | Organic Out Ni (g/L) | Strip Liquor Co (g/L) | Strip Liquor Ni (g/L) | Stripping Co (%) | Stripping Ni (%) |
|---|---|---|---|---|---|---|---|---|---|---|---|---|
| 1 | 5:1 | 45 | 8 | 10 | 0.038 | 1.07 | 0.002 | 0.139 | 0.194 | 2.03 | 95.4 | 87.2 |
| 2 | 3:1 | 48 | 8 | 10 | 0.067 | 1.44 | 0.000 | 0.490 | 0.428 | 3.54 | 99.6 | 65.9 |
| 3 | 5:1 | 49 | 10 | 10 | 0.071 | 1.50 | 0.000 | 0.529 | 0.359 | 3.98 | 99.7 | 54.7 |
| 4 | 20:1 | 53 | 10 | 40 | 0.076 | 1.35 | 0.000 | 0.276 | 0.445 | 3.70 | 99.7 | 79.5 |
| 5 | 20:1 | 48 | 8 | 40 | 0.077 | 1.49 | 0.000 | 0.437 | 1.04 | 7.59 | 99.7 | 40.6 |
| 6 | 29:1 | 50 | 8 | 60 | 0.105 | 1.71 | 0.000 | 0.535 | 2.41 | 16.8 | 99.8 | 68.6 |
| 7 | 26:1 | 49 | 8 | 80 | 0.086 | 1.62 | 0.003 | 0.336 | 2.13 | 15.8 | 99.7 | 79.3 |
| 8 | 20:1 | 50 | 8 | 80 | 0.080 | 1.63 | 0.000 | 0.193 | 2.43 | 24.3 | 99.7 | 88.2 |
| 9 | 20:1 | 51 | 8 | 45 | 0.080 | 1.27 | 0.002 | 0.226 | 2.54 | 19.0 | 98.1 | 82.2 |

As indicated in Table 30 a 20:1 O:A ratio and 45 g/L sulphuric acid was able to achieve the desired Ni stripped organic tenors of less than 0.25 g/L.

stripped organic heading back to extraction had a nickel tenor in the range of 180-250 ppm for the purposes of optimal extraction.

TABLE 31

Continuous Bulk Strip Results Example 15

| O:A Ratio | Stage | Free Acid (g/L) | Feed Organic (ppm) Ni | Feed Organic (ppm) Co | Feed Aqueous (ppm) Ni | Feed Aqueous (ppm) Co | Prod. Organic (ppm) Ni | Prod. Organic (ppm) Co | Prod. Aq (ppm) Ni | Prod. Aq (ppm) Co | Strip Efficiency (%) Ni | Strip Efficiency (%) Co |
|---|---|---|---|---|---|---|---|---|---|---|---|---|
| 20 | Acid Feed | 81.1 | — | — | — | — | — | — | — | — | — | — |
|  | S1 | 0.38 | 1880 | 497 | 19480 | 3770 | 1920 | 334 | 16670 | 6090 | −1.4 | 32.8 |
|  | S2 | 2.7 | 1920 | 334 | 9880 | 277 | 1250 | 26 | 19480 | 3770 | 27.8 | 92.2 |
|  | S3 | 30.1 | 1250 | 26 | 0 | 0 | 253 | 7 | 9880 | 277 | 79.8 | 73.1 |
|  | Overall | — | 1880 | 497 | 0 | 0 | 253 | 7 | 16670 | 6090 | 86.5 | 98.6 |
| 15 | Acid Fd | 81.1 | — | — | — | — | — | — | — | — | — | — |
|  | S1 | 0.25 | 1940 | 534 | 19000 | 3660 | 1990 | 384 | 16800 | 6470 | −1.6 | 28.1 |
|  | S2 | 5.07 | 1990 | 384 | 12200 | 340 | 1130 | 33 | 19000 | 3660 | 30.7 | 91.4 |
|  | S3 | 35.6 | 1130 | 33 | 0 | 0 | 178 | 3 | 12200 | 340 | 84.3 | 90.9 |
|  | Overall | — | 1940 | 534 | 0 | 0 | 178 | 3 | 16800 | 6470 | 90.8 | 99.4 |

When utilizing an O:A ratio of 20:1 and a free acid concentration of 81.1 g/L in a three stage counter current operation 99.5% of the acid feed into the circuit was utilized leaving 0.25 g/L FA in the Co/Ni product stream. This resulted in an overall stripping efficiency of 90.8% Ni and 99.4% Co. This operation allowed the Ni in the organic to be slightly less than the target of 180-250 ppm which indicates that an O:A ratio between 15 and 20 would sufficiently meet the required targets for this circuit.

Conclusions

A non selective stripping approach can be taken to successfully strip the Co and Ni from the organic solution while producing a product <3:1 Ni:Co.

Example 16

The following example illustrates the continuous results using the new invention for treating a nickel-cobalt sulphide feed solution. The data for this example is the averaged data that was taken when operating the new invention integrated with the CESL Cu/Ni Process over a one month period.

Co Extraction and Bulk Stripping

The extraction system was operated under the same conditions as presented in Example 8 and the strip circuit was operated in a three stage counter current mode with two acid feeds. A flow diagram for this circuit is presented in FIG. 13.

The operating parameters for the extraction and stripping stages are presented in Table 32.

TABLE 32

Operating Parameters for Example 16

| Parameter | Units | E1 | E2 | S1 | S2 | S3 |
|---|---|---|---|---|---|---|
| Temp | ° C. | 30 | 30 | 30 | 50 | 50 |
| External O:A | — | 1:1 | 1:1 | 17:1 | 17:1 | 17:1 |
| Mixer O:A | — | 1:1 | 1:1 | 1:1 | 1:1 | 1:1 |
| Mixer PC | — | A/C | A/C | A/C | A/C | A/C |
| Mixer RT | s | 15 | 6 | 5 min | 10 min | 10 min |
| In-line Mixer RT | s | 105 | 105 | — | — | — |
| Settler RT | min | 9.8 | 9.8 | 19.8 | 20.3 | 20.3 |

PC = phase continuity, RT = retention time, A/C = aqueous continuous, O/C = organic continuous The feed and product solutions for the series parallel extraction stages are presented in Table 33 and Table 34.

TABLE 33

Extraction Feed Assays for Example 16

| | Aqueous | | | | | | | Organic | | | | | |
|---|---|---|---|---|---|---|---|---|---|---|---|---|---|
| Stream | Ni ppm | Ca ppm | Cl ppm | Co ppm | Mg ppm | Mn ppm | Na ppm | Ni ppm | Ca ppm | Co ppm | Mg ppm | Mn ppm | Na ppm |
| PLS/SO | 21211 | 602 | 7918 | 780 | 109 | 4128 | 897 | 189 | 1 | 3 | <1 | <1 | 1186 |

TABLE 34

Product Assays for Example 16

| | Aqueous | | | Organic | | | | | |
|---|---|---|---|---|---|---|---|---|---|
| Stage | Ni ppm | Co ppm | Na ppm | Ni ppm | Ca ppm | Co ppm | Mn ppm | Mg ppm | Na ppm |
| 1 | 19938 | 222 | 2631 | 1394 | 1 | 589 | 3 | <1 | <1 |
| 2 | 17658 | 24 | 4506 | 2150 | 1 | 222 | 3 | <1 | <1 |

The extraction results achieved for continuous operations are presented in Table 35.

TABLE 35

Extraction Results for Example 16

| Stage | Ni % | Ca % | Co % | Mg % | Mn % | g NaOH/g Co extracted |
|---|---|---|---|---|---|---|
| 1 | 5.7 | 1.2 | 71.5 | 0 | 4.6 | 8.3 |
| 2 | 9.8 | 0.2 | 89.2 | 0 | 0 | |
| Overall | 15.5 | 1.3 | 96.9 | 0 | 1.8 | |

The strip circuit employed a two acid feed system to enable the tenors in the stripped organic to meet the target of 200 ppm Ni and with the thought that the strip product solution from S3 could be integrated with the final raffinate solution from the extraction stages which would produce a Ni:Co ratio >667:1.

Figure 13:
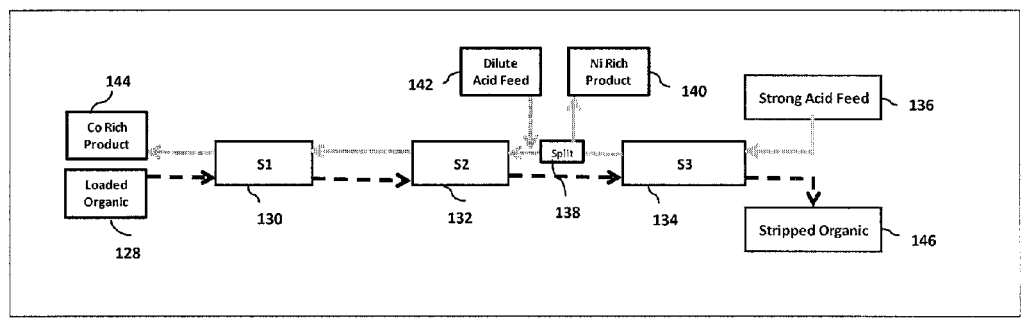
FIG. 13 is a simplified flow diagram illustrating a bulk stripping process with two acid feed streams and two separate product streams as described in Example 16.

The strip flowsheet is presented in FIG. 13.

FIG. 13 is a simplified flow diagram illustrating another bulk stripping option with two acid feed streams. The stripping comprises three stages 130, 132 and 134. The combined loaded organic 128 from extraction is introduced into the first stage stripping 130 and then passes to stages 132 and 134 to exit as stripped organic 146 from the third stage 134.

In the third stage of stripping 134 a strong acid feed solution 136 with free acid content of 37:3 g/L is added to remove the remaining Ni form the partially stripped organic. The product aqueous stream from this stage 134 is split, as shown at 138, with a 50% portion being a Ni product solution 140 with low levels of Co and the remaining stream is added to the second stage stripping 132.

In the second stage 132 another dilute acid stream 142 is introduced to enable the maintenance of a 20:1 organic:aqueous ratio across the circuit.

The first stage of stripping 130 produced the Co rich product 144 with a Ni:Co ratio of about 3:1. To enable the product stream 140 produced in 134 to be integrated with the final raffinate product in E2 the cobalt content could not be higher than 4 ppm Co. Average feed product compositions for the organic and aqueous streams for the stripping stages are presented in Table 36.

TABLE 36

Average Feed and Product Compositions for Strip Circuit Example 16

| Stream | FA g/L | Cl ppm | Mn ppm | Mg ppm | Co ppm | Ni ppm |
|---|---|---|---|---|---|---|
| LO | — | 3 | 2 | BDL | 404 | 1733 |
| Co Rich Product | 1.1 | 533 | 2 | 88 | 5185 | 16975 |
| S2 Acid Feed | 48.3 | — | — | — | — | — |
| SO | — | — | <1 | <1 | 2 | 183 |

TABLE 36-continued

Average Feed and Product Compositions
for Strip Circuit Example 16

| Stream | FA g/L | Cl ppm | Mn ppm | Mg ppm | Co ppm | Ni ppm |
|---|---|---|---|---|---|---|
| S3 Acid Feed | 37.3 | — | — | — | — | — |
| S3 Product | 36.6 | 116 | 2 | 4 | 143 | 8512 |

The average cobalt assay for the S3 product solution 140 was much higher than the desired 4 ppm at 143 ppm. This product would not be able to be introduced to the E2 raffinate because the Ni:Co ratio would be reduced from 736 to 475.

The performances of the three stage counter-current strip are outlined in Table 37.

As noted in the table the overall stripping efficiency of 89.4% Ni and 99.5% Co realized Ni tenors in the resulting stripped organic to be <200 ppm and the Co rich product had a Ni:Co ratio of 3:1.

TABLE 37

Average Stripping Efficiencies for Example 16

| Stage | Feed Organic (ppm) | | Feed Aqueous (ppm) | | Prod. Organic (ppm) | | Prod. Aq (ppm) | | Strip Efficiency (%) | |
|---|---|---|---|---|---|---|---|---|---|---|
| | Ni | Co | Ni | Co | Ni | Co | Ni | Co | Ni | Co |
| S1 | 1733 | 415 | 17580 | 1878 | 1724 | 139 | 16975 | 5185 | 0.30 | 67.0 |
| S2 | 1724 | 139 | 4256 | 72 | 746 | 9 | 17580 | 1878 | 47.9 | 93.5 |
| S3 | 746 | 9 | 0 | 0 | 183 | 2 | 8512 | 143 | 75.5 | 77.8 |
| Overall | 1733 | 415 | 0 | 0 | 183 | 2 | — | — | 89.4 | 99.5 |

Conclusions

The new invention successfully extracted Co in two stages and produced a raffinate with a Ni:Co ratio of 735:1 with minimal co-extraction of impurities and stripped the organic solution to <200 ppm Ni. The product solution produced from S3 had too much Co in solution to integrate with the final raffinate product. A Bulk strip where one acid feed is used producing one product solution would need to be used for this flowsheet as documented in Example 14.

TABLE 38

Effect of temperature on Co and Ni extraction
at pH 4.5 and an A/O ratio of 1:1

| Temp. (°C.) | Con. (g/L) | Concentrations (g/L) | | | | | |
|---|---|---|---|---|---|---|---|
| | | 15 (s) | 30 (s) | 45 (s) | 60 (s) | 90 (s) | 180 (s) |
| 22 | Co | 0.40 | 0.57 | 0.69 | 0.76 | 0.86 | 0.94 |
| | Ni | 0.24 | 0.40 | 0.54 | 0.67 | 0.86 | 1.42 |
| | Co/Ni ratio | 1.67 | 1.43 | 1.28 | 1.13 | 1.00 | 0.66 |
| 30 | Co | 0.25 | 0.43 | 0.58 | 0.69 | 0.79 | 0.56 |
| | Ni | 0.24 | 0.38 | 0.55 | 0.69 | 1.02 | 1.55 |
| | Co/Ni ratio | 1.07 | 1.13 | 1.05 | 0.99 | 0.77 | 0.36 |
| 35 | Co | 0.44 | 0.63 | 0.76 | 0.84 | 0.81 | 0.13 |
| | Ni | 0.36 | 0.61 | 0.85 | 1.14 | 1.47 | 1.94 |
| | Co/Ni ratio | 1.22 | 1.03 | 0.89 | 0.74 | 0.55 | 0.07 |
| 40 | Co | 0.54 | 0.79 | 0.59 | 0.41 | 0.09 | — |
| | Ni | 0.53 | 1.13 | 1.47 | 1.63 | 1.84 | — |
| | Co/Ni ratio | 1.02 | 0.70 | 0.40 | 0.25 | 0.05 | — |

The above-described embodiments of the invention are intended to be examples only. Alterations, modifications and variations can be effected to the particular embodiments by those of skill in the art without departing from the scope of the invention, which is defined solely by the claims appended hereto.

The invention claimed is:

1. A process for separating and recovering Co from Ni in an aqueous feed solution, comprising:
   subjecting the feed solution containing Ni and Co and impurities comprising Mg and Mn to extraction with an extractant and using kinetic differences between Ni and Co in the extraction by controlling duration of the extraction, thereby separating the Co from the Ni, and from the Mg and the Mn, whereby a major portion of Co and a minor portion of Ni is extracted from the feed solution to produce a loaded extractant and a Co-depleted raffinate containing Ni wherein the loaded extractant is enriched in Co and depleted in Ni compared to the feed solution, wherein the concentration of Ni in the feed solution is greater than the concentration of Co, and wherein the duration of extraction is about 30 to 240 seconds, wherein the feed solution contains impurities comprising at least one of Mg, Mn, and Ca wherein the molar ratio of (Mg+Mn):Co in the feed solution is at least 6:1,
   wherein the extraction is carried out in two successive stages, and
   wherein at least one of the two successive stages comprises adding an alkali to the extractant at about 0.01 to 0.15 grammole per liter of extractant.

2. The process of claim 1, wherein the feed solution is acidic.

3. The process of claim 1, wherein the feed solution is derived from leaching of ores or concentrates containing Ni and Co.

4. The process of claim 1, wherein the duration of the extraction is controlled by limiting the duration of the extraction to a period wherein a maximum ratio of Co:Ni has been extracted.

5. The process of claim 1, wherein the duration of the extraction is controlled by limiting the duration of the extraction to a period wherein a maximum ratio of Ni:Co remains unextracted.

6. The process of claim 1, wherein the duration of the extraction is controlled by limiting the duration of the extraction to a period wherein the ratio of Co:Ni that is extracted and the ratio of Ni:Co that remains unextracted are at a maximum ratio.

7. The process of claim 1, comprising a plurality of extractions.

8. The process of claim 7, wherein the duration of each of the extractions is about 30 to 240 seconds.

9. The process of claim 7, wherein the duration of each of the extractions is about 30 to 180 seconds.

10. The process of claim 1, wherein the extraction is carried out at a temperature of about 15° C. to 50° C.

11. The process of claim 1, wherein the extraction is carried out at a temperature of about 20° C. to 35° C.

12. The process of claim 1, wherein the extraction is carried out at an organic to aqueous ratio of about 0.5:1 to 4:1.

13. The process of claim 1, wherein the extraction is carried out at an organic to aqueous ratio of about 0.5:1 to 2:1.

14. The process of claim 1, wherein the alkali is selected from one or more of the group consisting of NaOH, $NH_3$ and KOH.

15. The process of claim 1, wherein the extraction is carried out at a pH of about 2.5 to 5.5.

16. The process of claim 1, wherein the extraction is carried out at a pH of about 3.8 to 4.7.

17. The process of claim 1, further comprising subjecting the extractant to saponification prior to contact with the aqueous feed solution, wherein the extractant is contacted with an alkali to pre-neutralize or saponify the extractant.

18. The process of claim 1, further comprising subjecting the extractant to partial saponification prior to contact with the aqueous feed solution and additional alkali is added during the extraction.

19. The process of claim 1, further comprising adding alkali to the combined organic and aqueous solution during the extraction.

20. The process of claim 1, wherein adding an alkali to the extractant is at about 0.02 to 0.08 grammole per liter of extractant during the first stage of the extraction.

21. The process of claim 1, wherein adding an alkali to the extractant is at about 0.01 to 0.15 grammole per liter of extractant during the second stage of the extraction.

22. The process of claim 1, wherein adding an alkali to the extractant is at about 0.02 to 0.08 grammole per liter of extractant during the second stage of the extraction.

23. The process of claim 1, wherein raffinate from the first stage is contacted by fresh or recycled stripped extractant in the second stage to extract more Co, thereby to further improve the Ni:Co ratio in raffinate produced by the second stage.

24. A hydrometallurgical process for the recovery of Ni or Co or both Ni and Co from a feed material containing Ni and Co, comprising subjecting the feed material to acid leaching to obtain a resultant acid leach solution and treating the acid leach solution according to the process of claim 1.

25. The process of claim 1, wherein the duration of the extraction is about 30 to 180 seconds.

26. The process of claim 1, wherein the extractant comprises a mixture of at least two extractants.

27. The process of claim 26, wherein the one extractant is a carboxylic acid and the other extractant is a hydroxyoxime.

28. The process of claim 27, wherein the carboxylic acid comprises 2-methyl, 2-ethyl heptanoic acid.

29. The process of claim 27, wherein the carboxylic acid extractant percentage is about 2 to 20 v/v % with reference to total volume of the extractants and a diluent.

30. The process of claim 27, wherein the carboxylic acid extractant percentage is about 2.5 to 5 v/v % with reference to total volume of the extractants and a diluent.

31. The process of claim 27, wherein the hydroxyoxime comprises 5,8-diethyl-7-hydroxy-6-dodecanone oxime.

32. The process of claim 27, wherein the hydroxyoxime extractant percentage is about 4 to 40 v/v % with reference to total volume of the extractants and a diluent.

33. The process of claim 27, wherein the hydroxyoxime extractant percentage is about 5 to 30 v/v % with reference to total volume of the extractants and a diluent.

34. The process of claim 1, further comprising stripping the Co and Ni from the loaded extractant with an acidic strip solution to produce a Co and Ni product solution and a stripped extractant which is recycled to the extraction.

35. The process of claim 34, wherein the product strip solution has a pH of about 1.5 to 2.5.

36. The process of claim 34, wherein the product solution has a pH of about 1.6 to 2.

37. The process of claim 34, wherein the stripping is carried out a temperature of about 30° C. to 60° C.

38. The process of claim 34, wherein the stripping is carried out a temperature of about 40° C. to 55° C.

39. The process of claim 34, wherein the stripping is carried out in 1 to 6 stages.

40. The process of claim 34, wherein the stripping is carried out in 2 to 4 stages.

41. The process of claim 34, wherein the stripping is carried out in one or more stages.

42. The process of claim 41, wherein the stripping is carried out for a duration of about 3 to 15 minutes per stage.

43. The process of claim 41, wherein the stripping is carried out for a duration of about 5 to 10 minutes per stage.

44. The process of claim 1, wherein the loaded extractant is subjected to stripping with an acidic solution to produce an aqueous product solution containing Ni and Co and further comprising subjecting the aqueous product solution to a further extraction stage to produce a Co-loaded extractant, which is subjected to further stripping to produce a Co product solution, and a second Ni raffinate which is combined with the Co-depleted raffinate from the Ni and Co extraction to produce a Ni product solution.

45. The process of claim 44, wherein the further extraction is carried out with a different extractant.

46. The process of claim 45, wherein the different extractant comprises bis 2,4,4-trimethylpentyl phosphinic acid.

47. The process of claim 1, further comprising selectively stripping Co from the loaded extractant with a dilute acidic strip solution to produce a Co solution and a partially stripped extractant and then subjecting the Co solution to a second Co extraction to produce a Co-loaded extractant and a second Ni raffinate.

48. The process of claim 47, wherein the Co solution has a pH of about 1 to 2.5.

49. The process of claim 47, wherein the Co solution has a pH of about 1.7 to 2.2.

50. The process of claim 47, wherein the selective stripping is carried out a temperature of about 20 to 40° C.

51. The process of claim 47, wherein the selective stripping is carried out a temperature of about 25 to 35° C.

52. The process of claim 47, wherein the selective stripping is carried out in 1 or 2 stages.

53. The process of claim 52, wherein the selective stripping is carried out for a duration of about 1 to 10 minutes per stage.

54. The process of claim 52, wherein the selective stripping is carried out for a duration of about 3 to 5 minutes per stage.

55. The process of claim 47, further comprising stripping Ni from the partially stripped extractant with a stronger acidic strip solution to produce a Ni solution and a stripped extractant and recycling the stripped extractant to the extraction.

56. The process of claim 55, wherein the Ni solution has a pH of about 1.0 to 2.0.

57. The process of claim 55, wherein the Ni solution has a pH of about 1.2 to 1.8.

58. The process of claim 55, wherein the stripping is carried out a temperature of about 30° C. to 60° C.

59. The process of claim 55, wherein the stripping is carried out a temperature of about 40° C. to 55° C.

60. The process of claim 55, wherein the stripping is carried out in 1 to 6 stages.

61. The process of claim 55, wherein the stripping is carried out in 2 to 4 stages.

62. The process of claim 55, wherein the stripping is carried out for a duration of about 3 to 15 minutes per stage.

63. The process of claim 55, wherein the stripping is carried out in one or more stages.

64. The process of claim 63, wherein the stripping is carried out for a duration of about 5 to 10 minutes per stage.

65. The process of claim 55 further comprising subjecting the Ni-solution to a third Co-extraction with stripped extractant from the second Co-extraction to produce a further Co-loaded extractant and a third Ni raffinate which is combined with both the Co-depleted raffinate from the extraction and the second Ni raffinate to produce a Ni product solution.

66. The process of claim 65, further comprising combining the further Co-loaded extractant with the Co-loaded extractant from the second Co extraction.

67. The process of claim 47, further comprising subjecting the Co-loaded extractant from the second Co-extraction to stripping to produce a Co product solution.

68. The process of claim 1, further comprising scrubbing any Mn present from the loaded extractant with a scrub aqueous solution comprising part of the solution enriched in Co or a part of the raffinate.

69. The process of claim 68, wherein the cobalt to manganese ratio in the scrub solution is about 10:1 to 0.75:1.

70. The process of claim 68, wherein the cobalt to manganese ratio in the scrub solution is about 1.6:1 to 0.4:1.

71. The process of claim 68, wherein the scrubbing is carried out at a temperature of about 20° C. to 40° C.

72. The process of claim 68, wherein the scrubbing is carried out at a temperature of about 25° C. to 35° C.

73. The process of claim 1, wherein the extraction is carried out using an inline mixer or pipe mixer for mixing the feed solution and the extractant.

74. The process of claim 73, wherein the feed solution and extractant are pre-mixed in a pre-mixing tank prior to mixing in the inline mixer or pipe mixer.

* * * * *